United States Patent [19]

Maynard et al.

[11] Patent Number: 4,885,868

[45] Date of Patent: Dec. 12, 1989

[54] BANDING TECHNIQUES FOR PLANT PROPAGATION

[75] Inventors: Brian K. Maynard; Nina L. Bassuk, both of Ithaca, N.Y.

[73] Assignee: Cornell Research Foundation, Inc., Ithaca, N.Y.

[21] Appl. No.: 219,819

[22] Filed: Jul. 15, 1988

Related U.S. Application Data

[63] Continuation of Ser. No. 937,586, Dec. 3, 1986, abandoned.

[51] Int. Cl.$^4$ .............................................. A01G 7/00
[52] U.S. Cl. ........................................ 47/58; 47/5.5; 47/DIG. 3
[58] Field of Search ..................... 47/5.5, 6, 7, 3, 8, 47/DIG. 3, 58; 24/442, 443, 447, 451

[56] References Cited

U.S. PATENT DOCUMENTS

| | | | |
|---|---|---|---|
| 1,860,255 | 5/1932 | L'Hammedien | 47/7 |
| 2,786,306 | 3/1957 | Eaton et al. | 47/5.5 |
| 2,958,981 | 11/1960 | Ruvensky | 47/5.5 |
| 3,420,617 | 1/1969 | Kimm | 47/57.5 X |
| 4,160,020 | 7/1979 | Ayer et al. | 604/897 X |
| 4,612,725 | 9/1986 | Driver | 47/58 |
| 4,653,433 | 3/1987 | Comparetti | 604/58 X |

FOREIGN PATENT DOCUMENTS

| | | | |
|---|---|---|---|
| 21963 | 1/1981 | European Pat. Off. | 47/5.5 |
| 1080653 | 8/1967 | United Kingdom | 24/442 |

OTHER PUBLICATIONS

Sheehan et al, "Propagation of Ornamental Plants by Lazering", Circular 141 from Agricultural Extension Service, Gainsville, Fla., Sep. 1955.
Howard et al, "Response of Apple Summer Cuttings to Severity of Stock Plant Pruning and to Stems Blanching", E. Malling Res. Stn., '85.
Miske et al, "Propagation of Hybrid Lilacs Using Stock Plant Etiolation", Jan. Environ. Hort., 1985.
Miske et al, J. Environ. Hort., 3:111–114, 1985, supplied by applicant.
Reid, Trans. and Proc. Bot. Soc. Edinb., 28:184–188 (1922).
Smith, Trans. and Proc. Bot. Soc. Edinb., 29:17–26 (1924).
Gardner, Pro. Amer. Soc. Hort. Sci., 34:323–329 (1936).
Galston et al, Amer. J. Bot., 36:85–94 (1979).
Galston et al, Amer. J. Bot., 40:512–516 (1953).
Shapiro (1958), K. V. Thimann (ed.), "The Physiology of Forest Trees", Ronald Press, NY, pp. 443–465.
Frolich, Proc. Int. Plant Prop. Soc., 11:277–283 (1961).
Hess (1969) in "Root Growth", (ed.), W. J. Whittington, Butterworths and Co. Ltd., London, pp. 42–53.
Ryan, Proc. Int. Plant Prop. Soc., 19:69–71 (1969).
Herman et al, Proc. Int. Plant Prop. Soc., 13:42–62 (1963).
Kawase, Physiol. Plant, 18:1066–1076 (1965).
Delargy et al, New Phytol., 81:117–127 (1978).
Harrison-Murray, Proc. Int. Plant Prop. Soc., 31:386–392 (1982).
Biran et al, Sci. Hortic., 1:125–131 (1973).
Hare, USFS Res. Note No. SO-202, Southern For. Expt. Sta., New Orleans, LA (1976).
Hare, Can. J. For. Res., 8:14–16 (1978).
Davis et al, J. Environ. Hort., 1:96–98 (1983).
Reuveni et al, Int. Soc. Hort. Sci. XXI Int. Hort. Congress, 1:1348 (1982).
Frolich, Calif. Avocado Soc. Yearbook, pp. 136–138 (1951).
Frolich et al, Calif. Avocado Soc. Yearbook, 55:97–109 (1972).
Schmidt, Int. Soc. Hort. Sci. XXI Int. Hort. Congress, 2:1785 (1982).
Mukherjee et al, J. Hort. Sci., 42:83–87 (1967).

(List continued on next page.)

Primary Examiner—Danton D. DeMille

[57] ABSTRACT

An opaque flexible separable hook and loop fastener, e.g. Velcro, is used to band a portion of a plant stemming to enhance rooting of a cutting subsequently derived therefrom. Etiolation prior to banding is contemplated. Coating the banding fastener with a root growth stimulating compound is contemplated.

12 Claims, 4 Drawing Sheets

OTHER PUBLICATIONS

Howard, Plant Propagation Rep. of E. Malling Res. Stn. for 1977 (1978).
Howard, Plant Propagation Rep. of E. Malling Res. Stn. for 1978 (1979).
Howard, Plant Propagation Rep. of E. Malling Res. Stn. for 1979 (1980).
Howard, Plant Propagation Rep. of E. Malling Res. Stn. for 1980 (1981).
Howard, Plant Propagation Rep. of E. Malling Res. Stn. for 1981 (1982).
Howard, Plant Propagation Rep. of E. Malling Res. Stn. for 1982 (1983).
Howard, Plant Propagation Rep. of E. Malling Res. Stn. for 1983 (1984).
Harrison-Murray et al, Int. Soc. Hort. Sci. XXI Int. Hort. Congress, Ab No. 1281 (1982).
Poulsen et al, Physiol. Plant., 49:359-396 (1980).
Christensen et al, Sci. Hort., 12:11-17 (1980).
Loach et al, Sci. Hort., 10:217-230 (1979).
Waxman, Plant Prop. Soc., 15:154-158 (1965).
Fischer et al, Sci. Hort., 7:171-178 (1977).
Borowski et al, Sci. Hort., 15:245-253 (1981).
Delargy et al, New Phytol., 82:341-347 (1979).
Herman, Diss. Purdue Univ. Ph.D. DAI 28:B P0494 (1967).
Stoutemeyer, Proc. Int. Plant. Prop. Soc., 11:252-260 (1961).
Kawase et al, J. Amer. Hort. Sci., 105:898-902 (1980).
Beakbane, Nature, 192:954-955 (1961).
Beakbane, Proc. Int. Plant Prop. Soc., 19:192-201 (1969).
Doud et al, J. Amer. Soc. Hort. Sci., 102:487-491 (1977).
Rowell, Proc. Int. Plant Prop. Soc., 31:392-397 (1981).
Hess, The Hormolog, 3:3-6 (1961).
Mukherjee et al, Science and Culture, 44:414-415 (1979).
Mukherjee et al, Sci. Hort., 10:295-300 (1979).
Schroeder, Cal. Avoc. Soc. Yearbook, 63:86-89 (1979).
McHardy, GC & HTJ, May 4, 1984, pp. 29-31.
Mohammed et al, Trop. Agric. (Trinidad), 61:200-204 (1984).
Thomson, Australian Hort., pp. 50-62, Jun. 1984.
Anderson, Proc. Int. Plant Prop. Soc., 31:138-141 (1982).

BANDING TECHNIQUES FOR PLANT PROPAGATION

This is a continuation of application Ser. No. 937,586, filed Dec. 3, 1986, now abandoned.

BACKGROUND OF THE INVENTION

Stem etiolation has been successfully used as a pretreatment in cutting propagation. The technique involves forcing new shoot growth under conditions of heavy shade or total darkness and then using this growth as the cutting propagule.

Banding is a pretreatment, adjunct to etiolation, which involves excluding light from that zone of the stem which is to become the cutting base. Banding may either be applied to etiolated shoots which are subsequently allowed to turn green in the light, or applied to lightgrown developing shoots which are still in the softwood stage, in which case the band is said to "blanch" the underlying tissues. The response to etiolation and banding are, in effect, the same in that the tissues shielded from light are characteristically chlorotic, and maintained in a soft or succulent condition.

The earliest reports of etiolation as a pretreatment to propagation by cuttings came in the 1920's. Black paper coverings were used to produce etiolated cuttings of camphor (Reid, *Trans. and Proc. Bot. Soc. Edinb.*, 28:184–188 (1922); Blackie et al, *Kew Bulletin*, pp 380–381 (1926)) and clematis (Smith, *Trans. and Proc. Bot. Soc. Edinb.*, 29:17–26 (1924)), which had not previously been known to root adventitiously. In 1936 Gardner referred to etiolation as a method of some practicality. His work with apple and other species was the first mention of etiolation and banding being used together to facilitate the rooting of difficult-to-root species. By wrapping black insulation tape close to the growing point, thus blanching the cuttings while they were still attached to the tree, he increased rooting by 70%. He also built light tight boxes in which to pre-etiolate shoots. These shoots were then banded for up to a year. After that time the cuttings of apple rooted at 98%. The response to etiolation plus banding varied among apple varieties, although in all instances it increased rooting. Gardner also made the first mention of root primordia, up to $\frac{1}{2}"$ in length, being produced under banded stems still on the tree. (See Gardner, *Pro. Amer. Soc. Hort. Sci.*, 34:323–329 (1936)).

Knight et al, *J. Pomol.*, 6:47–60 (1937) compared etiolation under black cloth with stooling as pretreatments to the propagation of plum tree stock. They found that etiolated cuttings rooted better, but were also more susceptable to infections of Botrytis, while stooled cuttings also rooted well, but suffered no losses to Botrytis.

The first physiological studies of the effects of light on rooting and plant morphogenesis came from A. W. Galston and coworkers (Galston et al, *Amer. J. Bot.*. 36:85–94 (1949); Galston et al, *Amer. J. Bot.*, 40:512–516 (1953): Galston et al, (1961), "Light and Life", W. D. McElroy and B. Glass (ed.). John Hopkins Press, Baltimore. pp 687–705). Galston et al, (1949 supra) studied the interaction of auxin with light and plant growth, noting that auxins profoundly influenced the growth and form of plants in minute amounts. They postulated that light affects morphogenesis by the alteration of endogenous auxin levels. Possible events affected by light included auxin synthesis, transport, photodestruction in intense light, the equilibrium of bound and free forms of auxin, and even changes in the activity of indole acetic acid (IAA) inactivating enzymes. They thought that light might also alter the responses of cells to auxin without affecting auxin levels. This might be caused by changing cell properties and affecting growth systems unrelated to auxin, thereby decreasing the apparent effectiveness of auxins. Light might even affect the synthesis of anti-auxins or nonspecific growth inhibitors (Galston et al, (1949 supra)). Attempts were made to separate these possible effects of light using a system which measured the growth of *Pisum sativum* 'Alaska'. Seedlings in this system were grown in the dark and then either maintained in darkness or exposed to light. They concluded that the effect of light was to decrease the tissue responsiveness to both endogenous and applied auxin (Galston et al, (1949 supra)).

Galston et al, (1953 supra) made note of the fact that the action spectrum for light effects on growth responses to auxin was nearly identical to that reported for photoperiodsensitive plants and set out to investigate the nature and kinetics of red-light induced growth responses to auxin in etiolated peas. They conjectured that light altered the activity of an enzyme involved in the regulation of auxin metabolism. Possibilities included the indole acetic acid oxidase (IAA-0) system, and catalase, which prevents the destruction of IAA by IAA-0. Both these systems were known to be markedly affected by visible radiation (Galston et al, (1953 supra)).

A later report by Galston et al, (1961 supra) listed some of the striking differences in morphology and physiology between light grown and dark grown pea stems (Table 1), suggesting that normal auxin relationships differ in the two forms.

Shapiro, (1958), K. V. Thimann (ed.), "The Physiology of Forest Trees". Ronald Press, N.Y. pp 443–465, used lombardy poplar as a model system to investigate the effect of light on the growth of dormant root primordia, found in the phloem of two year old stems as unorganized groups of meristematic cells. Shapiro determined that these root primordia were sensitive to red over far-red light, implicating the involvement of a phytochrome type photoreceptor. Shapiro also noted that banding stems induced root primordia growth in the shaded areas, but that this would not promote root growth in adjacent lighted areas. Thus Shapiro hypothesized that there were normobile factors affecting root growth which were influenced by light.

TABLE 1

| | Morphological differences between etiolated and light grown tissues. | |
|---|---|---|
| FACTOR | ETIOLATED | LIGHT GROWN |
| color | white | green |
| internode length | v. long | shorter |
| nutrition | heterotrophic | auto or heterotrophic |
| sucrose opt. | ~2% | ~1% |
| IAA opt. | ~$10^{-6}$ M | ~$10^{-4}$ M |
| IAA-O activ. | high | low |
| IAA-O inhib. | absent or low | high |

The years from 1960 to the present saw numerous important contributions to the understanding of both the use and mechanism of light exclusion in the promotion of root initiation and rootgrowth. Noteworthy reviews include that by Frolich, *Proc. Int. Plant Prop. Soc.*, 11:277–283 (1961), on work preceding this period, Hess, (1969), pp. 42–53, in "Root Growth", (ed.), W. J.

Whittington. Butterworths and Co. LTD., London, on the factors affecting root initiation, and Ryan, *Proc. Int. Plant Prop. Soc.*, 19:69–71 (1969), on etiolation effects on rooting. Hess confirmed that light plays a primary role among external influences on rooting, acting, Hess suggested, to improve rooting through a decrease in the lignification of the stem, and accompanying increases in free phenolic acid compounds. The latter acting directly as auxin cofactors to induce rooting, or as degrading enzymes (Hess, (1969 supra)). Ryan, (1969 supra) reported that the lack of chlorophyll characteristic of etiolated tissues was not likely to be of consequence to rooting, as etiolated shoots were known to green quickly in the light while the benefit of the etiolation declined gradually. Ryan also made the wise observation that in some plants rooting shows no sensitivity to light, as in philodendron, or juvenile forms of *Hedera helix*. The bulk of the work cited by Ryan verified that light inhibits rooting and root elongation, whether by light mediated changes in stem anatomy, cofactor levels, carbohydrates, or auxin status. In his summation of the previous 40 years of research on light and rooting Ryan stated that at that point, "with our present knowledge of the rooting response to exclusion of light, the propagator can continue to make use of the etiolation effect on otherwise difficult to propagate plants without knowing why it is so effective." (Ryan, (1969 supra)).

Practical investigations which have been undertaken to evaluate the etiolation, shading, and blanching of shoots as a pretreatment to cutting propagation are described in the above references as well as in the following: The beneficial effects of etiolation and banding have been reviewed a number of times (Frolich, (1961 supra); Herman et al, *Proc. Int. Plant Prop. Soc.*, 13:42–62 (1963); Kawase, *Physiol. Plant.*, 18:1066–176 (1965); Ryan, (1969 supra); Delargy et al, *New Phytol.*, 81:117–127 (1978); Harrison-Murray, *Proc. Int. Plant Prop. Soc.*, 31:386–392 (1982)). The significance of lighting during the stock plant growth period and rooting of cuttings, with respect to the success of propagation, has been firmly established.

The technique of etiolation was used extensively in the 1920's (Reid, (1922 supra); Smith, (1924 supra); Knight et al, (1937 supra)). The additional pretreatment of banding stems to promote or maintain etiolation was added by Gardner in 1936. The procedure has remained essentially unchanged since that time. Etiolation is usually effected by covering the stock plant with black cloth or polyethylene, fastened over a structure enclosing the plant. Banding is accomplished with black tape, paper, tubing, aluminum foil (Biran et al, *Sci. Hortic.*, 1:125–131 (1973); Davis et al, *J. Environ. Hort.*, 1:96–98 (1983); Hare, USFS Res. Note No. SO-202. Southern For. Expt. Sta., New Orleans, La (1976)), or even black paste (Reuveni et al, *Int. Soc. Hort. Sci. XXI Int. Hort. Congress.*, 1:1348 (1982)).

Interest in the practical uses of etiolation and the physiologicalanatomical basis for the etiolation effect has increased steadily since Frolich, (1961 supra), working with avocado, used etiolation to propagate experimental materials.

Perhaps the greatest contribution toward the development of a practical system for etiolation and banding has come from the efforts of researchers at the East Malling Research Station, Kent, England. From their work we have gained insight into the applicability of these pretreatments to a range of plant materials. Refinements in the process have been developed at East Malling, such as the use of heavy shade instead of complete darkness, ventilation of the shading structure, greening shoots for specified periods of time before taking cuttings, and comparisons of etiolation with banding as an additional pretreatment.

Methods of vegetative plant propagation such as mound layering (stooling) and air layering are based on the exclusion of light from the area to be rooted for a time before taking cuttings (Ryan (1969 supra)). The standard practice of placing cuttings in an opaque medium during rooting also benefits from the exclusion of light (Frolich (1961 supra)). The technique of stooling after etiolation has been used extensively by Frolich in his work with avocado. The procedure involves allowing shoots to extend in a dark chamber to a length of 3 inches before they are placed in a tarpaper collar filled with vermiculite to exclude light (Frolich, *Calif. Avocado Soc. Yearbook, pp* 136–138 (1951); Frolich, (1961 supra); Frolich et al, *Calif. Avocado Soc. Yearbook*, 55:97–109 (1972)). Schmidt, *Int. Soc. Hort. Sci. XXI Int. Hort. Congress.*, 2:1785 (1982) compared the methods of etiolation, banding, and stooling in the propagation of Tilia tomentosa 'Szeleste' and found the promotion of rooting to be due to the etiolation effect, and not the other effects of stooling (moisture, temperature).

Other pretreatments which have been used successfully with etiolation include hedging to induce shoot vigor (Delargy et al, (1978 supra); Mukherjee et al, *J. Hort. Sci.*, 42:83–87 (1967)), ring barking (Delargy et al, (1978 supra)), and defoliation of the cutting (Howard, Plant Propagation. Rep. E. Malling Res. Stn. for 1983. (1984)).

Investigations on the practical level have offered much food for thought on the usefulness of etiolation and banding pretreatments.

The first study on the importance of synchronizing etiolation with the development of shoots came from Reid, (1922 supra), who compared etiolation periods of 14 and 28 days. The latter yielded shoots which were noticeably more etiolated, though the shorter treatment alone promoted rooting to 80%. Smith, (1924 supra) observed that shoots etiolated for too long a time were weakened, and tended to perish easily in the rooting environment. Gardner, (1936 supra) applied etiolation to apple trees just before bud break, and banded shoots for up to one year before taking cuttings, still noting a tremendous increase in rooting. The rooting response of etiolated shoots followed a pattern which Gardner observed in woody cuttings in general: good through August, and then poor until bud break the next spring (Gardner, (1936 supra)). Etiolation need only be applied for a length of time sufficient to yield usable shoots for banding or taking cuttings (Delargy et al, (1978 supra): Howard, Plant propagation. Rep. E. Malling Res. Stn. for 1978 (1979)). Etiolation has even been applied up to 2 weeks after bud break, with no decrease in effectiveness (Howard, Plant propagation. Rep. E. Malling Res. Stn. for 1981 (1982)).

The absence of chlorophyll, which is characteristic of etiolation, has no bearing on rooting success (Ryan, (1969 supra); Howard, Plant propagation. Rep. E. Malling Res. Stn. for 1979 (1980)). In general greening occurs rapidly while the rooting response declines very slowly upon exposure to light (Harrison-Murray et al, *Int. Soc. Hort. Sci. XXI$^{st}$ Int. Hort. Congress, Hamburg. Abst.* 1281 (1982)). It has been shown that in some cases 3 to 6 weeks greening after etiolation had no effect on rooting (Howard, (1980 supra); Schmidt, (1982 supra)), while up to 9 months in the light only decreased rooting to a level 40% above that of non-etiolated shoots (Howard, (1982 supra)). Important evidence regarding the effect of greening on rooting came from a study of an apple explants, which showed that after 2 weeks of darkness greening for 0 to 4 days had no effect on rooting, while 8 to 16 days in the light markedly decreased rooting. The response of rooting to light seems to be exaggerated in the in vitro situation.

Questions about the etiolation effect on rooting often turn to changes other than light in the environment surrounding the shoots. Howard, Plant propagation. Rep. E. Malling Res. Stn. for 1982 (1983) demonstrated that ventilating or using reflective covers to reduce the temperature under an etiolation structure could decrease the enhancement of rooting by etiolation. Work completed the following year (Howard, (1984 supra)), however, indicated that root number, not rooting percentage, was actually affected. Temperatures under black plastic ran on the average only 5 C above uncovered controls, while temperatures under clear plastic rose 13 C (Howard, (1984 supra)). Humidity, with minimal ventilation, did not increase under plastic coverings. An interesting observation was that even clear polyethylene reduced light transmission by 30%, and increased the rooting of M.9 apple rootstock by 10% over that of the controls.

A very important contribution toward making etiolation a more practical technique was the evidence that the complete exclusion of light during the growth of the shoot is not requisite to the stimulation of rooting. The use of 50% Saran shading to etiolate stock plants of Dahlia improved rooting from 7 to 75 percent (Biran et al, (1973 supra)), while 96% shade promoted the rooting of Tilia as well as 100% shade (Schmidt, (1982 supra)). The East Malling group tested a range of shading and found no decrease in rooting with up to a 20% transmission of light; even 70% shade (30% light transmission) still promoted rooting to 25% over that of the light grown controls (Howard, (1982, 1983, 1984 supra)).

The primary benefit of using partial versus complete shade is that shoots grown with some light incident upon them are hardier and thus better able to resist infection by Botrytis (Howard, (1983, 1984 supra)) and the scorching which a premature exposure to full sunlight can produce in etiolated shoots, which are lacking in protective pigmentation (Gardner, (1936 supra): Howard, (1984 supra)). In terms of production scheduling cuttings may be taken up to two weeks earlier if the recovery from etiolation is not needed (Howard, (1983 supra)). The alternative to shading has been to accustom etiolated shoots to light by uncovering them stepwise over a week or so before removing the shade enclosure entirely (Howard, (1980 supra)).

The observation that any reduction of light intensity can increase rooting brings into consideration a number of reports dealing with the growth of stock plants under light of varying intensity. In testing of stock plant irradiances in the range of 7 to 68 $W*m^{-2}$ growing stock plants under lower irradiance was found to improve the rooting of Pisum (Anderson et al, Acta Hortic., 54:33–38 (1975): Hansen et al, Physiol. Plant., 32:170–173 (1974)), Hedera helix (Poulsen et al, Physiol. Plant., 49:359–396 (1980)), Malus (Christensen et al, Sci. Hort., 12:11–17 (1980)), Forsythia (Loach et al, Sci. Hort., 10:217–230 (1979)), and Vaccinium (Waxman, Plant Prop. Soc., 15:154–158 (1965)). In only a few instances has higher irradiance resulted in increased rooting, and then only root number was increased, rooting percentages being 100% in each case (Fisher et al, Sci. Hort., 7:171–178 (1977); Borowski et al, Sci. Hort., 15:245–253 (1981) - Chrysanthemum, Eliasson, Physiol. Plant., 43:13–18 (1978) - Pisum). The in vitro studies done with irradiance and rooting, in which other influences such as photoperiod, humidity, light quality, temperature and growing media are held constant, represent important insights into the effects lighting has on stock plants and the subsequent inhibition of root initiation (Anderson et al, (1975 supra); Hansen et al, (1974 supra): Christensen et al (1980 supra)).

The importance of using opaque banding material to maintain an etiolated section of stem, or in the case of blanching to exclude light from a section of stem grown in the light, has been well established by work done since Gardner's initial report in 1936 (Biran et al, (1973 supra): Delargy et al, (1978 supra): Delargy et al, New Phytol., 82:341–347 (1979): Harrison-Murray, (1982 supra); Schmidt, (1982 supra); Howard, Plant propagation. Rep. E. Malling Res. Stn. for 1976 (1977); Howard, Plant propagation. Rep. E. Malling Res. Stn. for 1977 (1978): Howard, Plant propagation. Rep. E. Malling Res. Stn. for 1980 (1981): Howard, (1979 to 1984 supra)).

Gardner, (1936 supra), in his work with apple, experimented with banding developing shoots close to the growing tip, or 1, 2, and 3 inches behind the tip. He left these bands on as the shoot matured, taking cuttings the next spring. Present methods commonly involve taking summer softwood cuttings, considerably shortening the time required for production. Banding very close to the developing tip gave the greatest response, while rooting response fell off as banding was applied further away from the shoot tip (Gardner, (1936 supra)). This indicates a need to exclude light early in the ontogeny of the shoot, before the cells derived from the shoot meristem have differentiated substantially. Gardner envisioned etiolation as an effective alternative to banding so closely to the easily damaged shoot tip, in which the exclusion of light could, from the time of bud break, influence the growth and differentiation of the shoot. Banding could then be applied further away from the shoot tip without endangering the growth of the apical meristem.

Howard, (1982 supra) also noted that blanching the stem immediately below the apex was nearly as effective as etiolation, in contrast to basal blanching which in previous studies proved ineffective in apple (Howard, (1981 supra)). Frolich's method of maintaining the etiolation effect was similar in that the daily addition of vermiculite to the tube surrounding the growing shoots kept light from the stem immediately below the apex (Frolich, (1951, 1961 supra)). Herman, Diss. Purdue Univ. Ph.D. DAI 28:B P0494 (1967) found that blanching was less effective than etiolation in enhancing the rooting of Phaseolus and Hibiscus, which could relate to the position of the band on the stem.

Very few reports of work with banding have indicated the width of band used. Delargy et al, (1979 supra) compared 2.5, 5, and 7.5 cm bands, and showed that 5 and 7.5 cm bands performed equally well, being 15% better than the 2.5 cm band, and 70% better than the control. Gardner did not experiment with varying band widths but had success with 2.5 to 3 inch (6.3 to 7.6 cm) width insulation tape (Gardner, (1936 supra)).

The same questions concerning the precise nature of the etiolation effect on rooting can be asked of banding. Though several studies have shown that clear plastic bands fail entirely to promote rooting, while opaque bands work quite well (Krul, (1968 supra): Kawase et al, (1980 supra); Delargy et al, (1979 supra)), no comparisons of clear banding at all, or measurements of the environmental conditions existent under black versus clear bands have been reported. Davis et al, (1983 supra) used aluminum foil to blanch a number of rhododendron cultivars and only 2 of 11 cultivars showed any increases in rooting. These disappointing results might be attributed to a need for prior etiolation, or a decrease in effectiveness when a reflective banding material is used. Biran et al, (1973 supra) shaded stock plants of *Dahlia variabilis* before banding with aluminum foil and achieved marked improvements in rooting.

The most apparent changes associated with the etiolation of shoots are those relating to the anatomy of the rooting zone in the resulting cuttings. The pronounced effects of etiolation include a lack of chlorophyll (equated with a characteristic chlorotic appearance), increases in internodal length, increased succulence, and decreased mechanical strength of stem tissues. A number of researchers have attributed a role for these changes in the stimulation of rooting by etiolation (for reviews see Stoutemeyer, *Proc. Int. Plant Prop. Soc.*, 11:252-260 (1961), and Hess, (1969 supra)).

As far back as the 1920's gross anatomical changes associated with etiolation were being correlated with improved rooting. Reid, (1922 supra) found that etiolated shoots of camphor showed no traces of lignification, a possible mechanical barrier to adventitious rooting (Beakbane, Nature, 192:954-955 (1961); Beakbane, *Proc. Int. Plant Prop. Soc.*, 19:192-201 (1969)), before the sixth stem node, as opposed to light grown stems which were lignified up to the third node. Etiolated stems also had less developed cell walls, and lacked the continuous fiber sheath found in light grown tissues (also see Smith, (1924 supra)—clematis, Blackie et al, (1926 supra)—camphor, Bid et al, *Acta Hort.*, 24:77-81 (1972) - mango). Doud et al, *J. Amer. Soc. Hort. Sci.*, 102:487-491 (1977) found much less sclerification in etiolated stems of Malus clones, which also rooted better than light grown stems. They established a strong negative correlation between degree of sclerification and rooting response. To the contrary, both Christensen et al, (1980 supra) and Raviv, Ph.D. thesis, Hebrew Univ. of Jerusalem (1981) concluded that, in their systems the presence of a fiber sheath had no direct effect on rooting. Hartmann et al, Plant Propagation: principles and practices. 4th edition (1983) agree with these researchers; even though plants with lower amounts of lignification and fiber often root more easily, these anatomical changes cannot be considered the primary determinants in rooting. In carnation stem cuttings, for example, roots which initiate within a thick fiber sheath will merely grow down before emerging. Beakbane, (1961 supra) noted that such mechanical barriers to rooting were not the only possibilities for decreased rooting because in poor rooting cuttings initials often would not form even to the inside of fiber sheaths.

One of the most cited arguments for anatomical involvement came from Frolich, (1961 supra) who showed that in avocado (*Persea americana*) there was no transmission of a rooting influence either up or down the stem from an etiolated section bordered by light grown tissue. This was supported by observations of Doss et al, *Acta Hort.*, 112:77-84 (1980) on the in vitro rooting of shoots of *Rubus idaeus* 'Meeker' which had been etiolated or blanched. While the length of the etiolated section was varied roots consistently initiated only in the etiolated sections. Delargy et al, (1978 supra) applied bands at positions on the stem adjacent to and distal from the cutting base, and found that rooting occurred twice as well when the rooting zone was also the etiolated zone, as opposed to being adjacent to the etiolated zone.

Contrary evidence for a transmissable etiolation effect has been presented by Kawase et al, (1980 supra), working with hypocotyls of *Phaseolus vulgaris* wrapped in black or clear plastic. In this rather elegant system roots formed only under black, not under clear, plastic. In an experiment using multiple bands placed along the stem, they found that the presence of a band would stimulate the rooting in a band immediately below, though not under a band basally removed by 4 cm. This suggests that there is a transmission of root promoting influence. The short distance over which the influence acted may indicate that the substances diffused from the banded area above to that below, as opposed to being actively transported. Howard, (1983 supra) reported that etiolation immediately distal to a basal opaque band increased root number under the band from 4.9 to 21.7 roots per cutting, indicating that substances produced in etiolated tissues can move basipetally and influence rooting in other areas shaded from light. More research will be needed to solve this particular controversy.

Other anatomical factors which have been studied include the effects of etiolation on internodal length. The longer nodes characteristic of etiolated stems have been correlated with higher rooting in pea (Veierskov, *Physiol. Plant.*, 42:146-150 (1978)). Two factors which may deserve more consideration in the future include (1) the effect of etiolation on the proportion of undifferentiated parenchyma in the pericycle and phloem ray systems of the stem, both sites of root initiation (Snyder, *Proc. Int. Plant Prop. Soc.*, 12:43-47 (1962)), and (2) light effects on the suberization of stem tissues, which has recently been correlated with the rooting success of 19 Australian woody plant species, acting perhaps as an anatomical barrier to root emergence (Williams et al, *Aust. J. Bot.*, 32:363-366 (1984)). Etiolation and banding promote increases in the proportion of stem tissues occupied by undifferentiated parenchyma (Stoltz et al, *Proc. Amer. Soc. Hort. Sci.*, 84:734-743 (1966); Stoltz et al, *Proc. Amer. Soc. Hort. Sci.*, 84:744-751 (1966): Herman, (1967 supra); Schmidt, (1982 supra)), which is known to be an intermediate in the initiation of adventitious roots (Hartmann et al, (1983 supra)), and could be associated with the increase in herbaceous character caused by etiolation and correlated with improved rooting (Frolich, (1961 supra); Bid et al, (1972 supra); Biran et al, (1973 supra); Christensen et al, (1980 supra)).

DESCRIPTION OF THE INVENTION

Figure 1:
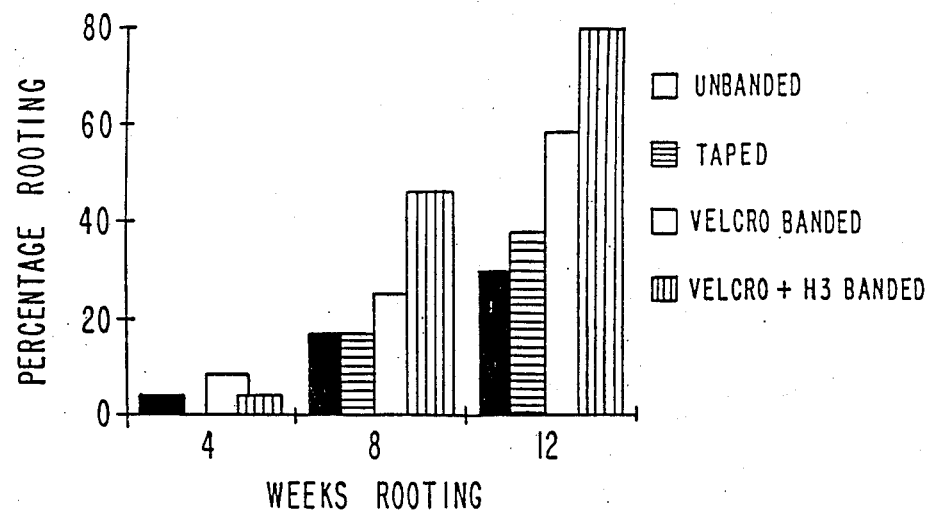
FIG. 1 graphically presents data on the rooting response of light grown shoots from 3 year old Pinus strobus to banding treatments.

This invention relates to a novel method for cutting propagation especially softwood cuttings from a number of important woody ornamentals, which comprises banding a portion of a plant stem to cause etiolation of and enhance rooting therefrom, wherein the banding is accomplished employing a preferably treated, opaque, flexible separable fastener comprising two flexible members (or a single two-sided member) each member (or side) provided with a very large number of closely spaced interchangeable hooking elements comprising hooks and loops made of flexible resilient material extending generally vertically from the member, whereby when the surfaces of the members are pressed toward one another in face-to-face relationship a very large number of said hooks will engage a very large number of said loops to secure said members in said face-to-face relationship. Such fasteners are described for example in U.S. Pat. Nos. 3,009,235; 3,820,277 and 2,717,437 all of which are hereby incorporated herein by reference. An example of such fasteners are fasteners sold under the trademark Velcro. As used hereinafter such fasteners are referred to as flexible separable hook and loop fasteners.

The preferred treatment of the flexible separable hook and loop fasteners used in the process of this invention comprises coating at least one hook and or loop contain side of the flexible separable hook and loop fasteners with a composition comprising a root growth stimulating compound adapted to cause enhanced rooting of a cutting formed from a plant stem banded with the treated fastener as compared to plant stem banded with untreated fastener.

The amount of root growth stimulating compound employed is not unduly critical. The compound can be employed as a pure compound or compounded with an inert particulate carrier in the form of a dust or powder. Typically the amount of powder a particulate retained by the hook and loops of the fasteners of the invention when applied thereto is more than adequate to provide an effective amount of the compound to the plant stem. While less desirable, the compound can be formulated and applied to the hooks and loops as a liquid which coats the surfaces of the hooks and loops and thereby deliver the active ingredient to the stem.

The root growth stimulating compound is typically a growth hormone known to be an effective rooting stimulating growth hormone for the particular plant treated a broadly useful hormone is indole butyric acid (IBA) sold as the commercial preparation (Hormodin 3). Other useful growth hormones include napthalene acetic acid (NAA), indole acetic acid (IAA) and 2,4-dioxane (2,4-D).

The processes of the invention comprise (a) banding, (b) etiolation plus banding, (c) banding plus root growth stimulating compound and (d) etiolation plus banding and root growth stimulating compound. As discussed in the Background of the Invention, both etiolation and banding (with tape), as well as etiolation plus banding with tape have been described in the literature. The process of the invention are an improvement over the prior art.

A first advantage of the invention is the fact that the flexible separable hook and loop fastener provides an easily attachable, reusable banding means, which is first, adapted to carry active treatment materials to plant material banded with the flexible separable hook and loop fastener. Secondly the hooks and loops of the flexible separable hook and loop fasteners are adapted to penetrate or at least more intimately contact or bruise the plant material such; that rooting action is more likely to occur.

When banding with or without the root growth stimulating compound is employed the flexible separable hook and loop fastener is applied to an area of succulent growth, e.g. a recently developed shoot or stem, in the area of that shoot or stem which subsequently, after cutting, will be the base of the cutting. The fastener is applied over an area sufficient and for a time sufficient to enhance the rootability for the cutting when subsequently planted as compared to a similar shoot or cutting which had not been banded in accordance with the invention. Typically the time span employed is a time sufficient to cause a visible reaction to light exclusion, usually about four to six weeks, although significantly shorter or longer times can be employed depending on the plant material, its age, climatic conditions, and the like. If root growth stimulating compound is applied in the banding process, typically a reaction to the compound will be evident by the end of the banding period, for example swelling, callusing or root primordium development.

When etiolation is employed prior to banding it is typically accomplished by covering at least the portion of the plant to be etiolated with an opaque, e.g. black, cloth which excludes at least about 95% of the incoming visible radiation. The covering, arranged to allow unimpeded shoot development, forces the growth of new shoots from dormant buds. The shoots are chloratic and in a soft or succulent condition. The time varies depending on the plant material, the climatic conditions and the like. Typically the covering is maintained until shoots at least about 5 to 10 cm in length are obtained. In practice, this period has usually been one to three weeks. The covering is then removed and the chloratic shoots banded with the flexible separable hook and loop fastener, with or without root growth stimulating compound. The previously etiolated plant material not covered by the banding is allow to grow, preferably taking care not to unduly shock the plant with sudden gross light changes, e.g. weaning to full light conditions over 4 to 10 days. The cutting can be made at any time after the greening of the remaining plant, but preferably delayed and the plant material treated in the manner described above for banding.

When the cutting is subsequent cut from the parent plant, it is treated in a manner consistent with the manner in which similar plant cuttings have been treated. Depending on the specific plant material it can be further treated or merely placed into propagation medium or soil as is conventional to horticulturists. For example, cuttings are taken at the end of the banding period (4-6 weeks after banding) by excising the shoot from the stock plant immediately below the band. The band is then removed; care being taken not to damage root primordia which may have formed under the band. The resultant cutting will appear normally green except for the base which will be yellowish in color (chlorotic)

and swollen. Any green stem tissues at the base of the cutting, below the etiolated or blanched zone, are trimmed away before further treatment of the cutting. Further hormone (growth regulator) applications may be used, especially if there is no evidence of root primordia having formed during the banding period. Typically indole butyric acid in concentrations of 0.19% to 0.8% in a talc base are used. Cuttings are then planted in a conventional propagation system and are subsequently treated in a normal manner with respect to the cutting propagation of that species.

For the purpose of this invention the width of the band of flexible separable hook and loop fasteners is not unduly critical. Typically, the bands can be from about 1.5 cm to about 10 cm wide preferably between about 2.0 cm and about 7.5 cm wide.

The process of the invention is useful with those plant materials previously known to have improved cutting propagation by etiolation, shading or banding pretreatments, e.g. rododendron, pine, sycamore, apple, avacado, Bryophyllum, camphor, clematis, jackfruit, linden, mango, plum, Polygonum, Cotinus, Corylus, Syringa, lilac, cherry, hibiscus, pistachio, euonymus, jade plant, rose and schefflera.

The process of the invention is broadly applicable to the generating of softwood cuttings for rooting from woody ornamentals, for example *Acer griseum, A. platanoides, A. rubrum, A. saccharum, Betula papyrifera, Carpinis betulus, Castanea mollissima, Pinus mugo, P. strobus, P. sylvestris, P. thunbergii, Quercus coccinea, Q. palustris, Q. robur, Q. rubra, Syringa vulgaris, Corylus americana* 'Rush', *Taxus X media,* and *Tilia cordata.* The process of the invention is particularly useful with *Pinus strobus, P. thunbergii, Syringa vulgaris, Acer griseum, A. saccharum, Betula papyrifera, Carpinus betulus, Castanea mollissima, Quercus coccinea,* and *Q. robur.*

EXAMPLES

Unless specified the following conditions were the same in each experiment.

Stock plant growing conditions in the greenhouse

Plants were potted in a mix of 1:1:1 soil:peat:perlite, fertilized and watered once weekly with 200 ppm N and K, and 100 ppm P. Incandescent lighting from a string of 40 Watt lightbulbs hung 1 meter apart and 1 meter above the plant canopy was used to maintain an 18 hour photoperiod. Air temperatures in the greenhouse were approximately 20° C. day/ 15° C. night.

Timing and duration of the etiolation and banding pretreatments

Figure 5:
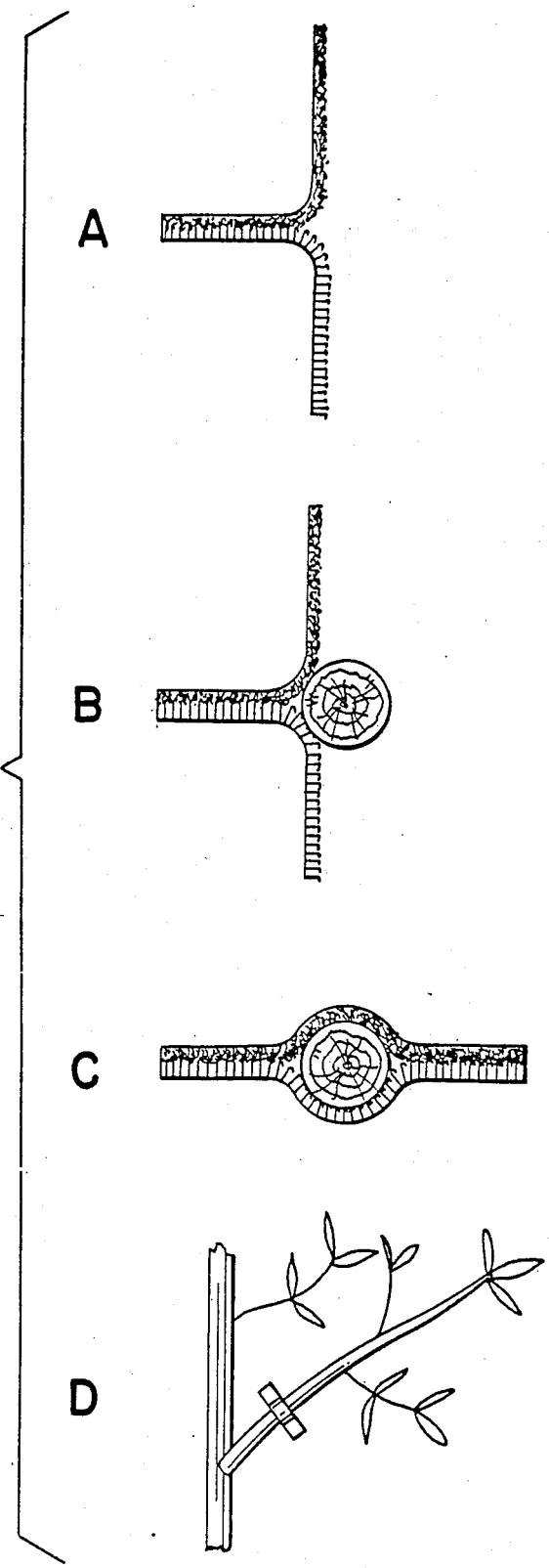
FIG. 5 fanatically represents the banding process using Velcro.

Etiolation was achieved by covering stock plants with either black cloth or black polyethylene. Coverings were applied just before bud break, as determined by noticeable changes in the swelling or softness of the buds and were left covering the stock plants for a period of two weeks, unless it was determined visually that shoot elongation needed to proceed for additional time. Covers were removed in stages by first admitting light on the north side and then, over the course of one week, rolling up the other three sides, to avoid stressing or scorching the delicate etiolated shoots. These problems were rarely encountered with coniferous material. Taping was accomplished with black plastic electrical tape 2 cm in width. Strips of tape were wound two to three times about one segment of the shoot. Velcro bands ranging in width from 1.6 to 2 cm widths were cut into 2.5 cm segments, peeled apart (FIG. 5 A), and pressed onto a section of stem (FIG. 5 B & C). Banding was applied either shortly after bud break (FIG. 5 D), in experiments where no etiolation pretreatment was used, or at the conclusion of the etiolation pretreatment. In all experiments light grown and etiolated shoots were banded at the same time at the base of the current flush of growth. Bands were typically left on the shoot for four weeks.

Use of root growth stimulating compound with banding

Root growth stimulating compound (a hormone) in a talc preparation was applied with banding by pressing either a section of electrical tape or an opened strip of Velcro onto a layer of the hormone in a petri dish (FIG. 5 A). A commercial preparation (Hormodin 3) containing 8000 ppm IBA w/w was used as the hormone in every case. Excess talc was tapped from the band before application to the shoot.

Treatment of cutting wood

All cuttings were basal cuttings taken by severing the shoot immediately below the banded or equivalent area. Deciduous cuttings were trimmed of the distal portion leaving a cutting 10 to 15 cm in length with 2 or 3 leaves. Coniferous cuttings were left intact, therefore the cutting length varied. If necessary, greened areas below the banded area were trimmed away so that only etiolated or blanched tissues formed the cutting base.

Cutting bases were then dipped in 1 cm of a preparation of 4000 ppm IBA plus 25% Captan fungicide in talc, tapped against the edge of the container to remove excess talc, and allowed to stand for 10 minutes before insertion into the rooting medium. The rooting medium used in all experiments was 2:1:1 perlite:peat:white sand. Holes for the cuttings were made in the medium before cuttings were inserted, to avoid rubbing talc off of the cuttings. The medium was then firmed around the cuttings. The propagation area was illuminated by incandescent lighting for a daily 18 hour photoperiod. The rooting medium was bottom heated to 25° C. and the cuttings misted for 6 seconds every 12 to 24 minutes from 6 AM to 8:30 PM. Air temperatures in the propagation house were 20° C. day/ 15° C. night. Shading, as white wash on the propagation house glass and 25% Saran hung above the propagation bench, was used from May until September.

Treatment of cuttings after rooting

Cuttings were removed by loosening the media round the cuttings and gently lifting them from the medium. The cutting bases were gently swirled in water to remove medium clinging to the base. Rooted cuttings were recorded as a percentage of those stuck, and root number for each rooted cutting was noted and averaged over all rooted cuttings.

Statistical Analysis of Results

Rooting data was statistically analyzed using the ANOVA (Proc GIM) option of the Statistical Applications Software (SAS) software package (1979 edition) when sufficient numbers of shoots were available to use replicated blocks. Rooting percentages were analyzed after conversion to arcsin (percentage)$^{-\frac{1}{2}}$, and reconverted to percentages before being presented in tables of results. Means were separated using the Waller-Duncan LSMEANS option. When the number of shoots was limited, cuttings were rooted in groups according to treatment, and the probability of significant differences calculated by the Chi-Square test for goodness of fit (Snedecor and Cochran 1980 Statistical Methods, 7$^{th}$ ed , Iowa State University, Press, Ames Iowa). Data analyzed by the Chi-Square test was judged significantly different only when the probability of a greater Chi-Square value was less than 0.05 percent.

Experiment 1: Etiolation and banding effects on the propagation of pine.

A. Experiments with seedling pines, 1984.

This first trial of etiolation and banding utilized three species of pine: *Pinus strobus* L., *P. sylvestris* L., *P. thunbergii* Paul. Three year old bare root seedlings shipped from nurseries in Indiana County, Pennsylvania were potted-up in April of 1984 and established in the greenhouse for approximately two weeks before the experiment commenced. Within each species sixty plants each were placed in either full sunlight, or complete exclusion of light (<1% light transmission) under a black shade cloth hung over the bench. The shoots were subjected to two weeks of this etiolation pretreatment and then given one of three additional pretreatments: banding with tape, Velcro, or Velcro plus Hormodin 3. Both light and dark grown shoots of *P. strobus* and *P. sylvestris* were treated in this manner. The control comprised light grown unbanded shoots. Due to severe losses from disease caused by species of Fusarium and Cylindrocarpon root rot fungi the dark treated plants of *P. thunbergii* were unusable. Post etiolation treatments lasted for 4, 8, or 12 weeks before cuttings were made of treated and untreated shoots. Rooting success was determined after 4, 8, and 12 weeks in the propagation bench.

B. Experiments with seedling pines, 1985.

Bare root 3-yr. old seedlings of *Pinus thunbergii* and *P. strobus* were potted-up in April, 1985. One month later bands of Velco plus hormone were applied to expanding light grown shoots. Once again unbanded shoots constituted the control. This banding treatment lasted 4 weeks. Shoot diameters under the bands and 1 cm distal were measured, using dial calipers, to the nearest mm at the time that cuttings were taken. The cuttings from each treatment were split into 4 replicate blocks of 8 to 10 cuttings each and placed in the propagation bench. Rooting was assessed at 3 months. The same experiment was run with seven year old specimens of *P. mugo* 'mughus'. Stem diameters were not measured, however, and cuttings were not split into replicate blocks.

C. Shading and banding of seedling pines growing outdoors, 1985.

Four year old containerized trees of *P. mugo* Turra., *P. strobus*, *P. sylvestris*, and *P. thunbergii* were overwintered in cold frames from 1984 to 1985. Each species was separated into two groups. One group was covered by 50% Saran shading the other left in full sunlight. One half of the shoots in each group were banded with velcro plus hormone, and the other half maintained as a control. Cuttings were taken at 4 weeks and rooted for 2 weeks.

This initial experiment involved the comparison of tape, flexible separable hook and loop fasteners e.g. Velcro, and flexible separable hook and loop fasteners plus hormone banding with and without the additional treatment of etiolation. Cuttings of *Pinus strobus* produced on the average 2.0 roots per rooted cutting, which did not differ between etiolation and banding treatments, or with the 3 harvest dates at which cuttings were taken.

Significant differences in the rooting of light grown shoots in response to treatment were not apparent before the 12th week in the rooting bench (FIG. 1). Therefore, throughout Experiment 1 the rooting response reported represents only that attained after 12 weeks in the propagation bench. By the 8th week of rooting, however, Velcro plus Hormodin 3 banding had increased rooting to 45%, nearly three times that of the unbanded control. The results for etiolation and banding of P. strobus are presented in Table 2.

TABLE 2.

The effect of etiolation and banding on percent rooting of *Pinus strobus* cuttings.

| | Duration of banding treatment (weeks): | | | | | | | |
|---|---|---|---|---|---|---|---|---|
| | 4 | | 8 | | 12 | | 16 | |
| Etiolation: | − | + | − | + | − | + | − | + |
| Banding type: | | | | | | | | |
| no band | 29.2 | 58.3* | 91.7 | 50.0 | 71.4 | 86.7 | 71.4 | 91.7 |
| tape | 37.5 | 50.0 | 75.0 | 100.0 | 76.5 | 75.0 | 73.3 | 87.5 |
| Velcro | 58.3* | 83.3* | 91.7 | 83.3 | 76.5 | 66.7 | 69.2 | — |
| Velcro + Hormodin 3 | 79.1* | 83.3* | 100.0 | 100.0 | 76.2 | 75.0 | 68.2 | 75.0 |

*significantly different from the light grown control at the same duration of banding, probability of a greater Chi-Square value <0.05.

Significant differences between treated and control cuttings were observed only when the banding treatment was applied for a period of 4 weeks. Untreated shoots (no etiolation no banding) taken after 8, 12, or 16 weeks rooted better than those taken at 4 weeks. Banded shoots rooted neither better nor worse in these latter periods, with the result that no treatment effects could be discerned after more than 4 weeks of banding treatment.

Etiolation alone significantly increased rooting at the 4 week stage. In no case was taping of significant advantage over the untreated controls. The combination of etiolation and flexible separable hook and loop fasteners banding yielded the best responses, though not significantly greater than either treatment alone.

*Pinus sylvestris* shoots produced 3.0 roots per rooted cutting on the average, which again did not vary among treatments. Banding was applied following etiolation for 4, 8, or 12 weeks. Light grown, unbanded shoots of *P. sylvestris* also rooted more readily as the summer progressed (Table 3).

In those shoots banded for 4 weeks, tapping, etiolation followed by flexible separable hook and loop fasteners, and etiolation followed by flexible separable hook and loop fasteners plus hormone banding resulted in significantly better rooting (Table 3). After 8 weeks it was Velcro, etiolation plus tape, and etiolation plus Velcro with hormone banding that improved rooting. By 12 weeks, due to the increase in control rooting, only etiolation in combination with taping had any effect on rooting.

TABLE 3

The effect of etiolation and banding on percent rooting of *Pinus sylvestris* cuttings.

| | Duration of banding treatment (weeks): | | | | | |
|---|---|---|---|---|---|---|
| | 4 | | 8 | | 12 | |
| Etiolation: | − | + | − | + | − | + |
| Banding type: | | | | | | |
| no band | 50.0 | 70.0 | 76.5 | 92.3 | 72.0 | 92.3 |
| tape | 91.7* | 87.5 | 80.0 | 100.0* | 64.3 | 100.0* |
| Velcro | 75.0 | 90.0* | 100.0* | 91.7 | 56.3 | 71.4 |
| Velcro + | 72.7 | 88.9* | 86.7 | 100.0* | 72.7 | 62.5 |

TABLE 3-continued

The effect of etiolation and banding on percent rooting of *Pinus sylvestris* cuttings.

| | Duration of banding treatment (weeks): | | | | | |
|---|---|---|---|---|---|---|
| | 4 | | 8 | | 12 | |
| Etiolation: | − | + | − | + | − | + |
| Hormodin 3 | | | | | | |

*significantly different from the light grown control at the same duration of banding, probability of a greater Chi-Square value <0.05.

A closer examination of the 4 and 8 week treatment groups reveals that any treatment improved rooting, though only those mentioned above were judged to be statistically significant.

All of the *Pinus thunbergii* seedlings subjected to etiolation succumbed to fungal attack before the treatment was completed. Therefore only the results of banded light grown shoots are presented (Table 4).

TABLE 4

The effect of banding on percent rooting of light grown *Pinus thunbergii* cuttings.

| | Duration of banding treatment (weeks): | | |
|---|---|---|---|
| | 4 | 8 | 12 |
| Banding type: | | | |
| no band | 58.3 | 88.2 | 85.7 |
| tape | 91.7* | 93.3 | 72.7 |
| Velcro | 83.3* | 58.8 | 50.0 |
| Velcro + Hormodin 3 | 91.7* | 93.3 | 100.0 |

*significantly different from the light grown control at the same duration of banding, probability of a greater Chi-Square value <0.05.

Figure 2:
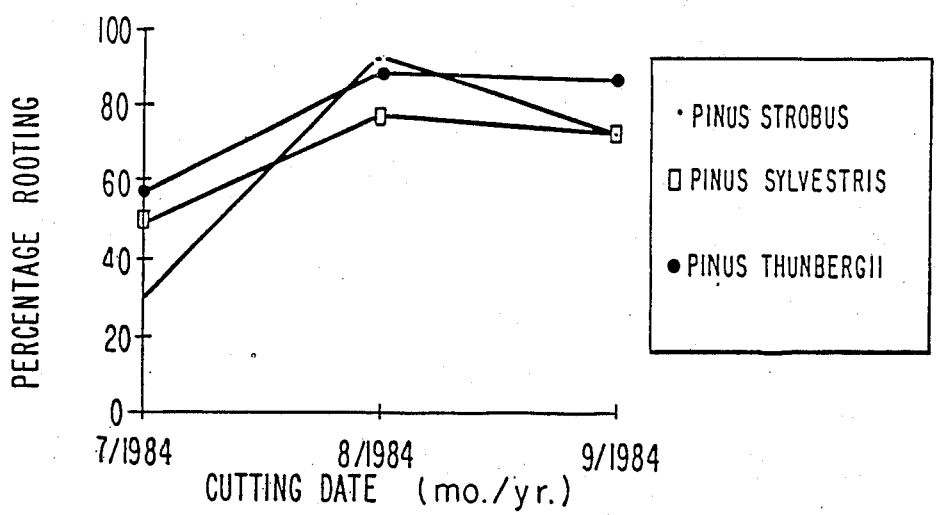
FIG. 2 graphically presents data on seasonal rooting response of light grown, unbanded (control) shoots of 3 year old pines. Percentage rooting recorded after 12 weeks in the propagation levels.

Banding of any sort for 4 weeks significantly improved the rooting response of light grown *P. thunbergii* shoots. No differences between banding methods were detected. In the trials with *P. thunbergii*, as in the trials with *P. strobus* and *P. sylvestris*, the rooting of the unetiolated, unbanded controls increased from the 4$^{th}$ to the 12$^{th}$ weeks after etiolation was ended (FIG. 2). Variation of this sort in the seasonal rooting of cuttings is not uncommon (Hartmann et al, (1983 supra)). Because of this, in part, significant improvements in rooting were observed only in the first selection of cutting taken after 4 weeks of banding. These results suggest that the etiolation and banding techniques might be useful in promoting successful cutting propagation during the "off-peak" periods of rooting responsiveness.

Figure 3:
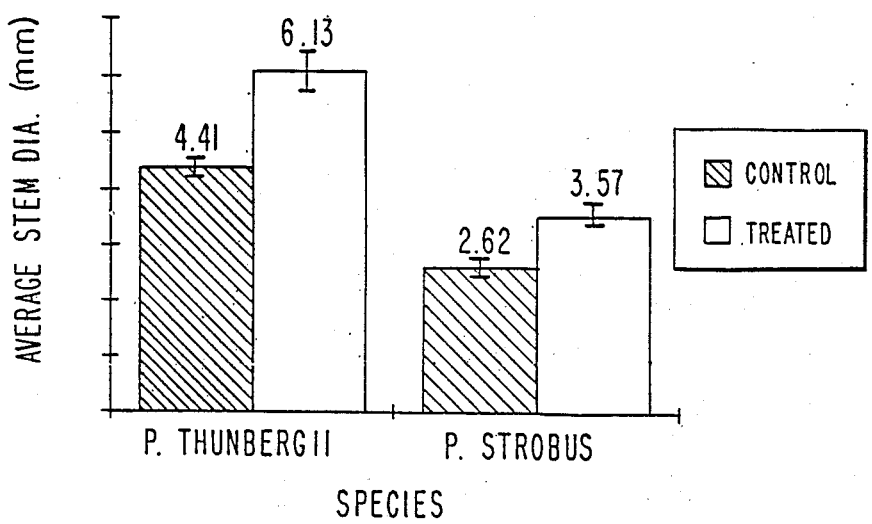
FIG. 3 graphically presents data on change in stem dramatic in response to Velcro plus hormone treatment in 3 year old *Pinus strobus* and *Pinus thunbergii* stock plants.

As noted with this last trial there were, in general, no differences between the types of banding used. Only for light grown shoots of *P. strobus* banded for 4 weeks was Velcro judged to be significantly better than tape. In a number of cases adding hormone to the velcro made small, statistically insignificant, improvements in rooting response. The primary advantage of using Velcro, as compared to electrical tape, judging from the results of Experiment la, was the ease with which it could be applied. Furthermore, tape tended to unwind from the stem within a few days and had to be resecured. And though no differences in rooting could be attributed to Velcro plus hormone over Velcro or tape, the observation was made that the area under a hormone laden band, besides being characteristically blanched, is significantly thicker than areas not treated with hormone (FIG. 3). This research did not pursue this phenomena at the anatomical level, but such swelling might be interpreted as a callusing or stimulation of cell division within the tissues of the stem, a condition which could facilitate root initiation (Stoltz et al, (1966 supra)). In conclusion, Experiment la demonstrated that etiolation alone, in trials with *P. strobus*, or etiolation in combination with banding pretreatments, in trials with *P. strobus* and *P. sylvestris* can significantly improve the rooting of stem cuttings. Shoots of *P. thunbergii* also responded positively to banding pretreatments.

Experiment 1b took place in the greenhouse in the spring of 1985. Due to limitations on the amount of plant material, and the desire to explore banding further, no etiolation pretreatments were applied. Three year old seedlings of *P. strobus* and *P. thunbergii* and 7 year old specimens of *P. mugo* were tested. The banding of these plants differed from that in Experiment 1a in that bud break and shoot elongation showed more variability. Banding was applied on one date to shoots ranging from the candle stage to those which were fully expanded. This may have influenced the response of shoots to the banding treatments such that *P. strobus* and *P. thunbergii* shoots exhibited no response to banding (Table 5). Shoots of *P. mugo*, however, rooted better and produced more roots per rooted cutting when Velcro plus hormone was applied for a 4 week period. The untreated shoots of *P. thunbergii* rooted at the same level as those banded for 4 weeks in Experiment 1a, while the untreated shoots of P. strobus rooted better, suggesting that the latter shoots may have been further along in their development when banded than the shoots in Experiment 1a.

TABLE 5

The effect of banding with Velcro + Hormodin 3 on percent rooting and root number of cuttings from three light grown species of pine.

| Pretreatment: | no banding | | Velcro + Hormodin 3 | |
|---|---|---|---|---|
| Species: | % rooting | r/rc$^x$ | % rooting | r/rc |
| *Pinus mugo* | 41.0 | 4.0 (0.7) | 64.0* | 8.0 (1.6)* |
| *Pinus strobus* | 76.3 | 2.7 (1.5) | 80.1 | 4.6 (2.5) |
| *Pinus thunbergii* | 67.3 | 5.0 (2.7) | 54.2 | 4.2 (2.5) |

*significantly different from the no band control, p = 0.05.
$^x$r/rc = average number of roots per rooted cutting with S.E. in parentheses.

The seedlings utilized in Experiment 1a were overwintered in coldframes and reused in the spring of 1985 in Experiment 1c. As in Experiment 1b, only the Velcro plus hormone treatment was applied, while the effect of shading from bud break until the taking of cuttings was investigated as an alternative to etiolation.

The results of Experiment 1c were disappointing in that banding and shading were in no cases of benefit, while losses to rotting in the propagation bench were quite high (Table 6). The timing of banding may have affected this, as many shoots were already expanded when Velcro was applied. Some of the trends in cutting mortality are worth noting here. In two species, *P. sylvestris* and *P. thunbergii*, shading doubled or quadrupled, respectively, cutting mortality. In *P. strobus* either banding or shading had the effect of raising cutting mortality to 23 percent, which doubled when the two were used in combination. Only in *P. strobus* did banding per se have any effect on mortality. Losses of *P. mugo* cuttings were high, from 80 to 100%. High mortality had also been noted in outdoor materials etiolated and banded in the summer of 1984. In those trials cuttings taken from mature trees *P. mugo* and *P. nigra* Arnold. suffered 100% mortality in the propagation bench. Extra precautions, such as surface sterilizing outdoor pine materials, may need to be taken to avoid such disheartening results.

The detrimental effect of shading might reflect the more succulent nature of the cutting material taken from shaded stock plants. The leaves of material grown in full sunlight would also be expected to exhibit a greater degree of xeromorphy, conferring some resistance to water loss and wilting (Esau, The Anatomy of Seed Plants, 2$^{nd}$ Edition. John Wiley & Sons, Inc. NY, N.Y. (1977)). Thus, shaded cuttings might be more prone to desiccation or fungal attack once they are severed from the parent and placed in the propagation bench.

The results of Experiments 1a through 1c suggest that Velcro can only be recommended over electrical tape for use in propagating pines because of its convenience. An added advantage of Velcro is that the bands may be washed and reused again and again, compensating for the one striking drawback to using Velcro instead of tape - cost.

TABLE 6

The effect of shading and banding with Velcro + Hormodin 3 on percent rooting of cuttings from four outdoor grown pine species.

| Treatment: | | none | Velcro + H3 | Shading | Shading + Velcro + H3 |
|---|---|---|---|---|---|
| Species: | | | | | |
| Pinus mugo | % Rooting | 9.3 | 2.7 | 10.7 | — |
| | % Dead | 81.4 | 89.2 | 89.3 | 100.0 |
| P. strobus | % Rooting | 22.1 | 15.5 | 16.3 | 15.5 |
| | % Dead | 3.5 | 23.9* | 23.3* | 47.9* |
| P. sylvestris | % Rooting | 20.0 | 32.5 | 15.2 | 6.5 |
| | % Dead | 37.5 | 32.5 | 72.7* | 93.6* |
| P. thunbergii | % Rooting | 43.3 | 58.3 | 14.3 | 13.8 |
| | % Dead | 13.3 | 12.5 | 48.6* | 55.2* |

*significantly different from the untreated control, probability of a greater Chi-Square value <0.05.

Shading was examined in Experiment 1c for two reasons. First, the work of Hansen and coworkers (Hansen et al, Plant Physiol. 61:975–979 (1978); Hansen et al, Physiol. Plant., 54:99–106 (1982)) has shown that reductions in the amount of light incident upon the stock plant increased the subsequent rooting of cuttings in an in vitro rooting bioassay using P. sylvestris. Also, work at the East Malling Research Station has indicated that admitting up to 30% of ambient light during the etiolation period was of little detriment to rooting, and was actually beneficial in that increasing ventilation reduced the incidence of Botrytis infection and the susceptibility of etiolated shoots to sunscorch (Harrison-Murray, (1982, supra)). In Experiment 1c, shading pines up to the time of taking cuttings was disastrous. It may be that a period of exposure to full sunlight following etiolation or shading, i.e. during the banding period, is necessary when propagating pines in situ.

The results of Experiment 1 suggest that a stock plant treatment incorporating 4 weeks of etiolation followed by 4 weeks of banding might be helpful in improving the rooting of several species of pine. The results of Experiment 1b suggest that in banding an awareness of the developmental stage of the shoot might be important. Timing may be the most crucial factor determining the efficacy of the banding pretreatment. Light grown shoots maintain a succulence for a short period before the stem tissues mature and "harden-off". It is during this period that banding seems to be most effective. One of the benefits of using the etiolation pretreatment in combination with the banding pretreatment is that, by preventing exposure of the stem to light, the period is lengthened during which banding can be successful (Gardner, (1936 supra)). Thereby permitting all of the shoots to reach a usable size and extent of development before banding is applied (Delargy et al, (1978 supra); Howard, (1979 supra)). Some researchers have applied the band close behind the growing shoot tip, to take advantage of the succulent tissues present there (Gardner, (1936 supra); Howard, (1979 supra)). In these experiments the bands were applied at the base of the present flush of growth, yielding more cuttings which were of a usable length than if bands had been placed close to the shoot tip.

Experiment 2: Experiments with deciduous material.

Etiolation and banding pretreatments were applied to 1-yr old seedlings of eight deciduous species and six varieties of 3-yr old container grown lilac, Syringa vulgaris L. (Table 7). Stock plants of the eight species were obtained bare root and potted into 2 gal. plastic pots. Lilac stock plants were previously established in 5 gallon plastic pots. After about 2 weeks buds began to break, at which point one-half of the plants were covered with black cloth. Two weeks later the covers were lifted and flexible separable hook and loop fasteners plus Hormodin 3 applied to one half of the shoots on each of the etiolated and light grown plants. The coverings were removed from etiolated plants in stages, to avoid scorching the tender shoots. The shoots remained banded for 4 weeks before cuttings were taken. Depending upon the speed at which rooting occurred, which varied between species, rooting was assessed at two to four weeks after cuttings had been placed in the rooting medium.

TABLE 7

| Species tested in Experiment 2 | |
|---|---|
| Acer griseum Pax. | Syringa vulgaris L. 'Belle de Nancy' |
| Betula papyrifera Marsh. | 'Charles Joly' |
| Carpinus betulus L. | 'Charles X' |
| Castanea mollissima Bl. | 'Madame Lemoine' |
| Quercus coccinea Muenchh. | 'Michel Buchner' |
| Q. palustris Muenchh. | 'President Grevy' |
| Q. robur L. | |
| Q. rubra L. | |

Etiolation and Velcro plus hormone banding treatments were applied to a wide range of difficult-to-root deciduous materials. Greenhouse grown seedlings as well as older stock plants of nine species were used in Experiment 2, including six cultivars of common Lilac, Syringa vulgaris.

In all but two species significant improvements in rooting were obtained when etiolation, banding, or the combination of the two treatments were used (Table 8). Treated shoots of Quercus palustris and Q. rubra responded with small, statistically insignificant improvements in rooting when etiolation and banding, respectively were applied.

The treatment response of the other species and cultivars may be grouped according to those which responded best to banding, to etiolation, or to the application of both pretreatments.

The shoots of 3 species, Syringa vulgaris cv. 'Mme. Lemoine', Acer griseum, and Q. coccinea absolutely required both etiolation and banding for a significant improvement in rooting. This combination was also optimal for the Lilac cultivar 'Michel Buchner', Betula papyrifera, Carpinus betulus, and Castanea mollissima.

Etiolation was absolutely required for shoots of Castanea mollissima and Betula papyrifera to root to a greater degree than the control, while banding alone sufficed for improved rooting of *Carpinus betulus*.

TABLE 8

The effect of etiolation and banding with Velcro + Hormodin 3 on percent rooting of cuttings from greenhouse grown stock plants of 9 species.

| | Light | | Etiolation | |
|---|---|---|---|---|
| Light treatment: | no | Velcro + | no | Velcro + |
| Banding treatment: | band | H3 | band | H3 |
| Species: | | | | |
| *Acer griseum* | 6.7 a | 11.7 ab | 14.2 ab | 34.1 b |
| *Betula papyrifera* | 50.9 a | 65.0 ab | 71.0 b | 100.0 c |
| *Carpinus betulus* | 0.0 a | 62.5 b | 5.5 a | 93.8 c |
| *Castanea mollissima* | 0.0 | 0.0 | 44.4* | 100.0* |
| *Syringa vulgaris* cv. | | | | |
| 'Belle de Nancy' | 27.8 a[x] | 65.0 a | 20.8 a | 37.5 a |
| 'Charles Joly' | 0.0 a | 50.6 b | 26.2 b | 62.5 b |
| 'Charles X' | 20.0 a | 69.7 c | 44.9 b | 79.3 c |
| 'Michel Buchner' | 21.4 a | 79.3 c | 43.3 b | 82.5 c |
| 'Mme. Lemoine' | 10.0 a | 10.4 a | 20.7 a | 82.6 b |
| 'Pres. Grevy' | 16.7 a | 47.6 a | 34.8 a | 41.7 a |
| *Quercus coccinea* | 0.0 | 0.0 | 0.0 | 45.5* |
| *Q. palustris* | 30.8 | 23.5 | 50.0 | 44.4 |
| *Q. robur* | 36.1 a | 70.0 b | 53.3 b | 58.5 b |
| *Q. rubra* | 37.1 | 50.0 | 28.6 | 35.0 |

[x]letters indicate separation within rows by Waller-Duncan means separation, p = 0.05.
*significant from the no-band control, probability of a greater Chi-Square separation <0.05.

The observation was made that root primordia formed under the Velcro bands on shoots of *Betula papyrifera* and *Carpinus betulus* still attached to the stock plant. Banding treatments were more effective than etiolation in improving the rooting of the Lilac cultivars 'Michel Buchner' and 'Charles X'. Meanwhile, either treatment was satisfactory for the rooting of *Quercus robur* shoots. The numbers of roots per rooted cutting did not vary according to treatment in any of the species tested. Root numbers varied from an average of 2 per cutting for *Acer griseum* to 11 for *Betula papyrifera*.

Figure 4:
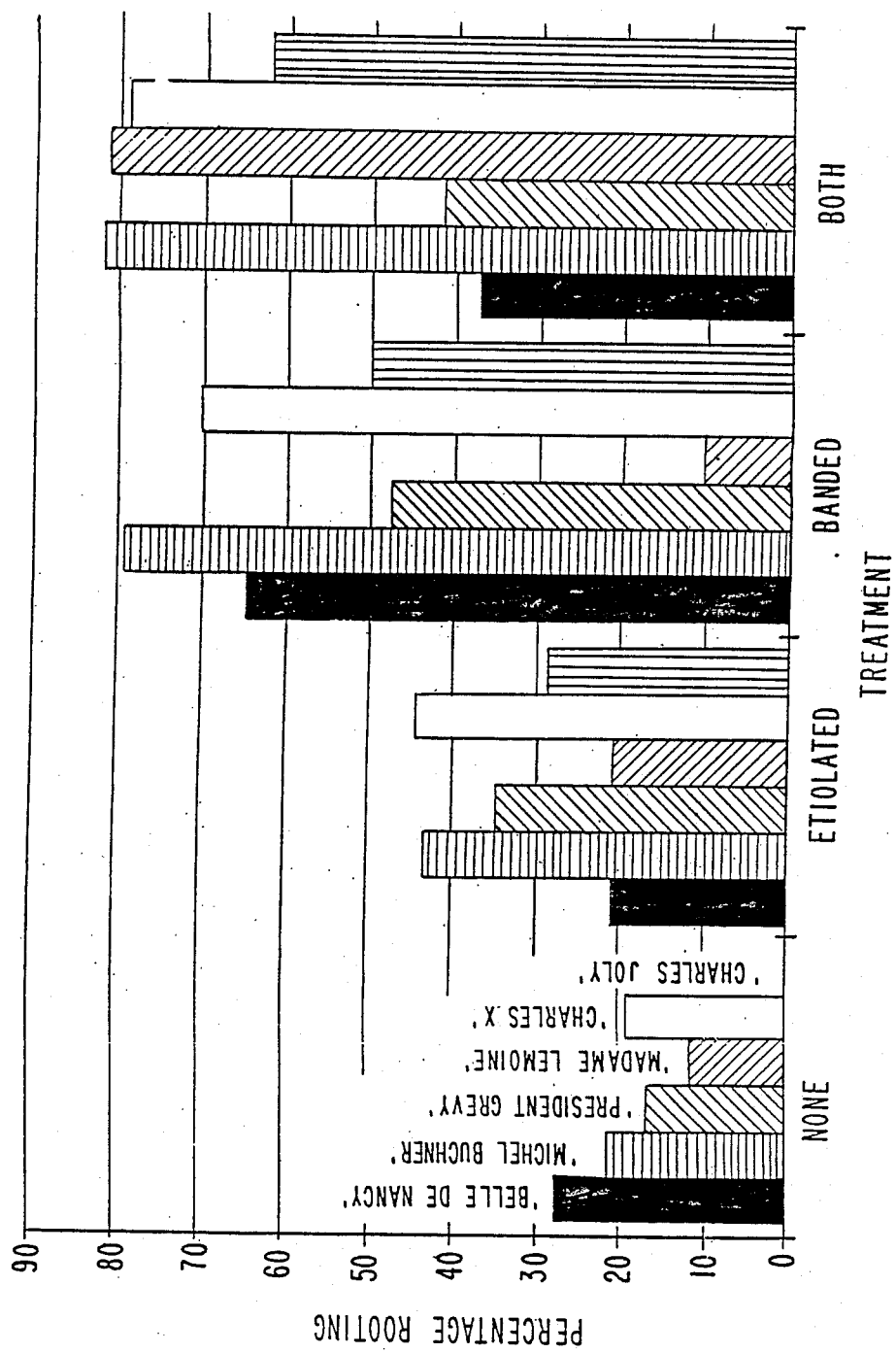
FIG. 4 graphically presents data on the rooting cultivar stock plants to etiolation and banding.

These results indicate the wide variability among species in their response to etiolation and banding treatments. FIG. 4 illustrates the range of variation among the six lilac cultivars tested. Some cultivars responded more to one treatment than the other, though the combination of etiolation and Velcro banding gave the highest rooting response in 5 of 7 cultivar trials. Averaging the lilac cultivar responses within treatments revealed that the rooting of banded shoots with or without the etiolation pretreatment (54.1% and 46.5% respectively) was significantly greater than that of etiolated, unbanded shoots (33.1%), which in turn was significantly better than untreated shoots (23.6%).

Numerous studies comparing the relative effectiveness of etiolation and banding have been made with respect to the cutting propagation of apple. Beginning with the research of Gardner, (1936 supra) up through that of Delargy et al, (1978, 1979 supra) and Howard, (1979-1982 supra) it has been shown repeatedly that for this species etiolation is about twice as effective as taping in promoting rooting, while the combination of the two always exceeds the response obtained with either treatment alone.

The results of Experiment 2 expand considerably the list of species for which etiolation and/or banding treatments have improved the rooting of cuttings.

Experiment 3: Experiments with outdoor material.

Mature trees of *Acer griseum*, and hedges of *Tilia cordata* Mill. and *Taxus* X *media* located in the Cornell Plantations Hedge Collection, were propagated following etiolation and banding pretreatments. Shoots of *Acer griseum* were etiolated under coverings of black plastic stretched over wire (tomato-cage) frames hung from the branches. The hedges were covered by black plastic on wooden T-frames. Vertical slits placed every 5" to 10" in the coverings afforded ventilation to the growing shoots. Despite the light admitted by this manipulation the resulting shoots were characteristically etiolated.

After shoots had elongated under the etiolation structures for two weeks, the covers were removed. This was done gradually over the period of one week, first loosening the cover at the base, and then opening it towards the top. Banding for a period of 4 weeks began at the time the covers were first removed.

Experiment 3 examined the response of shoots taken from mature specimens of 3 difficult-to-root species to etiolation and flexible separable hook and loop fasteners banding treatments. Adult cutting material is often more difficult to propagate by cuttings than younger material; thus we were interested in whether the etiolation and banding techniques would overcome this barrier to rooting.

The response of adult *Acer griseum* shoots to cutting propagation was, as expected, very poor (Table 9). The only response obtained was from shoots which had been both etiolated and banded, though this result was not significantly better than the complete lack of rooting seen in the control cuttings. It is interesting to note that the same conditions produced a significant increase in the rooting of 1-yr old material of the same species (Experiment 2).

TABLE 9

The effect of etiolation and banding with Velcro on percent rooting of cuttings taken from outdoor stock plants.

| Light treatment: | Light | | | Etiolation | | |
|---|---|---|---|---|---|---|
| Banding treatment: | no band | Velcro | Velcro + H3 | no band | Velcro | Velcro + H3 |
| Species: | | | | | | |
| *Acer griseum* | 0.0 | — | 0.0 | 0.0 | — | 5.0 |
| *Tilia cordata* | 11.1 | — | 4.0 | 0.0 | — | 8.3 |
| *Taxus* X *media* | 33.1 | 60.0* | 20.0 | 58.2 | 100.0* | 87.5* |

*significantly different from the light control, probability of a greater Chi-Square value <0.05.

Cuttings of *Tilia cordata* rooted very poorly, to which etiolation or Velcro banding offered no improvement. This was surprising, given Howard's success with the propagating this species following etiolation and banding (Howard, (1983 supra)). An average of 2 roots per rooted cutting were produced, which did not differ among treatments.

The trial with hedged *Taxus* X *media* included the banding treatment of Velcro without hormone, which significantly increased rooting over that of light grown, unbanded shoots. Etiolation in combination with Velcro plus hormone banding, also significantly improved rooting. The number of roots per cutting averaged 10.0, and did not vary among treatments. In a visual examination of rooting it was noted, however, that the rooting of light grown material was restricted to the base, while etiolated material rooted up along the stem, supporting the observations of Knight et al, (1937 supra), Shapiro, (1958 supra), and Baadsmand et al, *Physiologia Plant.*, 61:107-113 (1984).

Given just the results of Tilia and *Acer griseum*, it would seem that the use of these techniques for the propagation of mature material is in need of refinement. The data presented in Experiment 4, however, suggest that an unfortunate choice of species was made in Experiment 3, with the exception of *Taxus X media*.

Experiment 4: The effects of hormone and Velcro structure on cutting propagation.

These experiments investigated the effects of the hooks/nubs of the flexible separable hook and loop fasteners strip, and of applying hormone during banding on the subsequent rooting response of several deciduous difficult-to-root species. In the first of the three experiments plants were either light grown or etiolated for a period of 4 weeks. Six banding variants were tested: banding with tape, 'denubbed' Velcro, Velcro, or each of these with the addition of Hormodin 3. Banding was applied for 4 weeks. Strips of Velcro were 'denubbed' by melting the hooks on the one side of the Velcro strip with the heated blade of a spatula. In the rest of the experiments when etiolation was applied it was followed by Velcro plus hormone banding or no banding treatment. In Experiment 4c the effect of continuous shading was also tested (see Experiment 1c).

A. Greenhouse work with *Acer platanoides* L.

Three year old trees of *Acer platanoides* growing in the greenhouse were divided into two groups, one etiolated during bud break, the other light grown. The six banding treatments described above were applied at the time the etiolation cover was removed. Cuttings were taken 4 weeks after banding was applied. Rooting was assessed 5 weeks later.

B. Greenhouse work with *Acer rubrum* L. and *Acer saccharum* Marsh.

One year greenhouse grown seedlings of *Acer rubrum* and *Acer saccharum* were separated into two groups, one etiolated and one light grown. Due to poor bud break in etiolated plants, only light grown shoots were given the full banding treatment detailed in Experiment 4a. Etiolated shoots were banded with Velcro plus hormone only. Cuttings were taken after four weeks.

C. Work with mature outdoor stock.

Mature hedges of *Carpinus betulus* (aged 10 and 30 years), *Corylus americana* Marsh. 'Rush', and *Quercus robur* in the Plantations Hedge Collection were treated with etiolation or shading as described for *Tilia cordata* in Experiment 3. Twenty-five shoots from each of these pretreatments were banded with Velcro plus hormone. One hundred fifty light grown shoots on each hedge were divided among each of the six banding treatments described above. Etiolation was stopped at the time that banding was applied, while shading continued up to the time that cuttings were taken. Treated and control cuttings were taken 4 weeks after banding was applied.

Experiment 1 demonstrated that flexible separable hook and loop fasteners banding improves the rooting response in pines as well as does electrical tape, and that additional hormone applied with Velcro further stimulates rooting. Experiment 4 was undertaken, therefore, to determine the relative merit of two aspects particular to the use of flexible separable hook and loop fasteners as a banding material.

Flexible separable hook and loop fasteners has advantages over tape in that it is easier to use, i.e. it need only be pressed into place on the stem, as opposed to wrapping several times to obtain a tight fit, and it is reusable and will readily carry hormone for application to the stem. In the experiments with pine it was observed that the application of hormone to the stem via a Velcro band caused a significant increase in stem diameter (FIG. 3). Wounding of the banded area is also apparent whenever Velcro is used, appearing as small necrotic spots in a regular pattern corresponding to the arrangement of hooks on the Velcro band. Though the present research did not directly address this point it is possible that the increase in stem diameter reflects internal changes in the stem facilitating adventitious rooting. It is an attractive hypothesis that the hormon laden hooks of the Velcro band could inoculate the succulent stem with root promoting auxin, stimulating callusing and the formation of root primordia while the stem is still attached to the mother plant.

In this experiment seven deciduous species were selected for trials investigating (1) the requirement for additional hormone application with banding, and (2) the necessity of having hooks on the Velcro band contacting the stem. The results of Experiment 4 are presented in Table 10. In only one case, that trial with the 30 yr hedge of *Carpinus betulus*, did the number of roots per rooted cutting vary as a result of banding or etiolation treatment.

The first species tested, *Acer platanoides*, showed no significant improvement of rooting in response to etiolation. Banding in any form promoted rooting. No differences between banding forms, with or without hormone, were evident. The combination of etiolation with banding generally resulted in small but statistically insignificant increases in rooting over that of the control. This may indicate a detrimental effect of etiolation on the rooting response of this species. Cuttings of *Acer platanoides* produced about 10 roots per rooted cutting, regardless of treatment.

TABLE 10

The effect of etiolation, shading, and variations of banding on percent rooting of cuttings taken from seven deciduous species.

| Species: | | none | tape | denub | Velcro | Tape + H3 | Denub + H3 | Velcro + H3 |
|---|---|---|---|---|---|---|---|---|
| Acer | light | 18 | 41* | 62* | 44* | 56* | 54* | 60* |
| platanoides | etiol. | 16 | 44* | 33 | 20 | 43 | 30 | 43 |
| (3 yr. seedlings) | | | | | | | | |
| A. | light | 100 | 67 | 60 | 36 | 60 | 44 | 100 |
| rubrum | etiol. | 95 | — | — | — | — | — | 100 |
| (1 yr. seedlings) | | | | | | | | |
| A. | light | 47 | 64 | 70 | 67 | 60 | 30 | 64 |
| saccharum | etiol. | 65 | — | — | — | — | — | 86* |
| (1 yr. seedlings) | | | | | | | | |
| Carpinus | light | 19.2 | 43.5 | 46.2* | 15.2 | 39.1 | 41.7 | 65.2* |
| betulus | etiol | 95.5* | — | — | — | — | — | 92.0* |
| | shade | 89.3* | — | — | — | — | — | 80.0* |

TABLE 10-continued

The effect of etiolation, shading, and variations of banding on percent rooting of cuttings taken from seven deciduous species.

| Species: | | none | tape | denub | Velcro | Tape + H3 | Denub + H3 | Velcro + H3 |
|---|---|---|---|---|---|---|---|---|
| (10 yr. hedge) | | | | | | | | |
| C. | light | 14.3 | 41.2* | 37.5* | 44.4* | 35.3 | 57.1* | 51.9* |
| betulus | etiol. | 37.0 | — | — | — | — | — | 72.0* |
| | shade | 50.0* | — | — | — | — | — | 69.2* |
| (30 yr. hedge) | | | | | | | | |
| Corylus | light | 4.0 | 22.2 | 45.8* | 22.7* | 62.5* | 75.0* | 83.3* |
| americana | etiol. | 0.0 | — | — | — | — | — | 87.0* |
| 'Rush' | shade | 0.0 | — | — | — | — | — | 75.0* |
| (20 yr. hedge) | | | | | | | | |
| Quercus | light | 0.0 | 15.0 | 21.1* | 5.3 | 5.9 | 12.5 | 9.1 |
| robur | etiol. | 27.3* | — | — | — | — | — | 36.4* |
| | shade | 8.0 | — | — | — | — | — | 9.1 |
| (30 yr. hedge) | | | | | | | | |

*significantly different from the light grown control, $p < 0.05$.

The two other maple species tested in a greenhouse situation failed, in general, to respond to etiolation or banding in any form. Indeed, *Acer rubrum* shoots rooted 100% without any treatment while any treatment, save the Velcro plus hormone banding, reduced rooting. Banding increased the rooting of *Acer saccharum* shoots an average of 12 percent; etiolation by 18 percent; and the combination of etiolation with banding by 39 percent, the only significant improvement. One might suspect that, in an experiment involving more replication, treatment differences only hinted at here would become significant. These maples also displayed no variations in root number in response to treatment, producing, on the average, 12 and 7 roots per rooted cutting respectively.

The trials with mature hedges included the treatment of shading with 50% Saran, from the time of bud break till the harvesting of cuttings. It was originally hypothesized that shading would represent a less stressful alternative to etiolation for influencing shoot development. And though Experiment 1c indicated that the shading of pine cuttings can be of great detriment, there was no effect of shading on the mortality of cuttings taken in this experiment.

Shoots from the younger of the two *Carpinus betulus* hedges tested showed increased rooting in response to both etiolation and shading. Denubbed Velcro and Velcro plus hormone, alone or in combination with etiolation or shading, also increased rooting. Additional hormone was of advantage only when applied with regular Velcro (but see Table 12). The etiolation or shading of *Carpinus betulus* increased rooting as much as when the additional treatment of banding was applied. An average of 11 roots per rooted cutting were produced.

Conversely, in the 30 year old hedge of *Carpinus betulus* etiolation increased rooting to only one-half that obtained when Velcro banding was also used. Etiolation and tape plus hormone were the only treatments which failed to enhance the rooting response. Again, the addition of hormone to the banding treatments made no difference in rooting. The treatment yielding the greatest response was the combination of etiolation and flexible separable hook and loop fasteners + hormone banding. As indicated in Table 11 the number of roots per rooted cutting varied with the treatment received. In particular it may be seen that cuttings from shoots treated with Velcro or Velcro with hormone produced more roots than cuttings from unbanded shoots, regardless of the lighting pretreatment.

TABLE 11

Roots per rooted cutting of shoots rooted from a 30 year old hedge of *Carpinus betulus*, in response to etiolation, shading, and variations of banding.

| | Stock plant lighting treatment: | | |
|---|---|---|---|
| Banding treatment: | none | etiolation | shading |
| none | 4.0 cd$^x$ | 3.0 d | 3.8 cd |
| tape (T) | 8.0 abc | — | — |
| T plus hormone (H3) | 9.5 ab | — | — |
| denubbed velcro (DN) | 5.7 bcd | — | — |
| DN plus H3 | 5.9 bcd | — | — |
| velcro (V) | 10.7 a | — | — |
| V plus H3 | 10.7 a | 7.3 abcd | 7.4 abcd |

$^x$separation of all means of ANOVA. Means accompanied by different letters differ at the 0.05 level. $LSD_{0.05} = 4.5$.

The trial with *Corylus americana* 'Rush' revealed several interesting responses. Flexible separable hook and loop fasteners banding significantly improved rooting, whether or not it was denubbed, while the addition of hormone to the bands for the first time significantly improved rooting. Neither etiolation nor shading increased the rooting response, whether or not additional banding was applied. An average of 7 roots per rooted cutting were produced.

Shoots taken from a mature hedge of *Quercus robur* rooted less well than those taken from 1-yr. seedlings of the same species, and produced only half the number of roots (2) per rooted cutting (Experiment 2). Excepting the treatment with denubbed Velcro, etiolation yielded the only significant increases in rooting. The highest response was obtained from shoots which had been both etiolated and banded, though this was not significantly greater than when shoots were merely etiolated.

As pointed out in Experiment 2, the response to pretreatments varied among species. The extremes encountered in Experiment 4 are represented by *Quercus robur*, which required etiolation for a significant response, and *Corylus americana* 'Rush', which responded only to banding.

In only one case, with shoots of *Carpinus betulus*, did the hooks of the Velcro band seem to be of consequence, and then with respect to root number, not rooting proportion. And in only one case, with Corylus, did adding hormone improve rooting. Yet, in one-half of the trials, it was the combination of etiolation and Velcro plus hormone banding that generated the greatest rooting response. Also, in 4 of the 7 trials Velcro banding was an improvement over taping. This might relate to the fact that Velcro tends to yield to increases in stem diameter, maintaining the exclusion of light, instead of either unwinding or constricting the stem, as can occur with electrical tape. In cases where Velcro did not improve rooting significantly more than tape it is the ease of application which recommends the use of Velcro bands over tape.

TABLE 12

Only those comparisons between treatments and the untreated controls are presented in TABLE 11. Using the Chi-Square test of goodness of fit, all pairwise comparisons were tested. Those which were significant at the 0.05 level are listed below:

Significant differences indicated by a pairwise comparison of percent rooting responses using the Chi-Square goodness of fit test at the 0.05 level, to etiolation and banding treatments of four species tested in Experiment 4.

KEY - First letter: L-light grown; E-etiolated; S-shaded

Subsequent letters: C-controls (unbanded); T-taped;

TH-taped with hormone; DN-denubbed velcro; DNH-denubbed velcro with hormone; V-velcro; VH-velcro plus hormone.

*Acer platanoides*: LT>LC, LDN>LC, LV>LC, EVH>LC, LT>EC, LDN>EC, LV>EC, EVH>EC, LDN>EV.

*Carpinus betulus*: (10 yr. hedge) LDN>LC, LVH>LC, EC>LC, EVH>LC, SC>LC, SVH>LC, EVH>LTH, SVH>LTH, EVH>LDNH, SVH>LDNH, LVH>LV, EVH>LVH.

*Carpinus betulus*: (30 yr. hedge) LT>LC, LDN>LC, LDNH>LC, LV>LC, LVH>LC, EVH>LC, SVH>LC, EVH>LTH, SVH>LTH, EVH>EC.

*Corylus avellana*: LTH>LC, LDN>LC, LDNH>LC, LVH>LC, EVH>LC, SVH>LC, LTH>LT, LDNH>LT, LDNH>LDN, LVH>LDN, LTH>LV, LDNH>LV, LVH>LV, EVH>EC, SVH>SC.

The results of Experiments 1 through 4 established that the stock plant pretreatments of etiolation and banding may be used with success on a wide range of species, both deciduous and evergreen. Table 13 lists the best rooting responses of softwood cuttings reported for the species tested in this study.

Two points should be kept in mind when comparing the success attained here with that of previous studies. First, the age of the stock plant material can have a dramatic effect on the success of propagation, older material rooting much less well than younger material (note that in Table 13 ages, where known, are included in parentheses next to the percent rooting response). Secondly, there is no way of ascertaining how the developmental stage of the cutting material used in the present study compares to that used in other studies. For many woody species an optimum period for rooting exists. Many of the studies cited either examined or noted the critical nature of timing in the taking of cuttings In one study with *Acer saccharum*, for example, there was an optimum time for rooting cuttings during a few days in late June, when the rooting response reached 85% (Morsink, *Proc. Int. Plant Prop. Soc.*, 21:420–423 (1971). This optimum was flanked, however, by lengthy periods during which rooting failed to exceed 20%. The present study did not address this aspect of cutting propagation, the material used here could have been at any point on such a rooting curve.

TABLE 13

Highest previously reported and highest present rooting responses in 12 woody ornamentals.

| Species | Best Rooting (%) | Notes |
|---|---|---|
| *Acer griseum* | 46 (A) | — |
| | 80 (1) | — |
| *A. saccharum* | 90 (J) | — |
| *Betula papyrifera* | 100 (?) | timing |
| *Carpinus betulus* | no controlled studies done | |
| *Corylus* spp. | 45 (?) | etiolated |
| *Syringa vulgaris* cv. | | |
| 'Belle de Nancy' | 60 (3) | etiolated |
| 'Charles Joly' | 67 (3) | etiolated |
| 'Charles X' | 78 (3) | etiolated |
| 'Michele Buchner' | 100 (3) | etiolated |
| 'Mm. Lemoine' | 82 (3) | etiolated |
| 'Pres. Grevy' | 60 (3) | etiolated |
| *Pinus mugo* | 100 (8) | timing age dependent |
| *P. strobus* | 100 (4) | timing age dependent |
| *P. sylvestris* | 20 (12) | timing age dependent |
| *P. thunbergii* | 40 (1) | timing age dependent |
| | 2 (3) | timing age dependent |
| *Quercus robur* | 50 (?) | — |
| *Taxus X media* | 100 | commercially viable |

| Species | Reference | Best in Present Study |
|---|---|---|
| *Acer griseum* | Fordham, Proc. Int. Plant Prop. Soc., 19:346–348 (1969) Brotzman, Proc. Int. Plant Prop. Soc., 30:342–345 (1980) | 34 (1) |
| *A. saccharum* | Morsink, (1971 supra) | 86 (1) |
| *Betula papyrifera* | Hares, Proc. Int. Plant Prop. Soc., 18:67–68 (1968) | 100 (1) |
| *Carpinus betulus* 72 (30) | no controlled studies | 94 (1) |
| *Corylus* spp. | Rowell, Proc. Int. Plant Prop. Soc., 31:392–397 (1981) | 87 (20) |
| *Syringa vulgaris* cv. 'Belle de Nancy' | Miske, D.M. 1985. Propagation of hybrid lilacs using etiolation pretreatment of the stock plants. MPS Project Report, Cornell University. | 65 (4) |
| 'Charles Joly' | Miske, D.M. 1985. Propagation of hybrid lilacs using etiolation pretreatment of stock plants. MPS Project Report, Cornell University. | 63 (4) |
| 'Charles X' | Miske, D.M. 1985. Propagation of hybrid lilacs using etiolation pretreatment of the stock plants. MPS Project Report, Cornell University. | 79 (4) |
| 'Michele Buchner' | Miske, D.M. 1985. Propagation of hybrid lilacs using etiolation pretreatment of the stock plants. MPS Project Report, Cornell University. | 83 (4) |
| 'Mm. Lemoine' | Miske, D.M. 1985. Propagation of hybrid lilacs using etiolation pretreatment of the stock plants. MPS Project Report, Cornell University. | 83 (4) |
| 'Pres. Grevy' | Miske, D.M. 1985. Propagation of hybrid lilacs using | 48 (4) |

TABLE 13-continued

Highest previously reported and highest present rooting responses in 12 woody ornamentals.

etiolation pretreatment of the stock plants. MPS Project Report, Cornell University.

| | | |
|---|---|---|
| Pinus mugo | Ticknor, Proc. Int. Plant Prop. Soc., 19:132-137 (1969) | 64 (7) |
| P. strobus | Ticknor, Proc. Int. Plant Prop. Soc., 19:132-137 (1969) | 100 (3) |
| P. sylvestris | Ticknor Proc. Int. Plant Prop. Soc., 19:132-137 (1969) | 100 (3) |
| P. thunbergii | Ticknor, Proc. Int. Plant Prop. Soc., 19:132-137 (1869) | 100 (3) |
| Quercus robur | Flemer, Proc. Int. Plant Prop. Soc., 12:168-171 (1962) | 36 (30) |
| Taxus X media | Flemer Proc. Int. Plant Prop. Soc., 12:168-171 (1962) | 100 (30) |

KEY -
( ) age in years,
A = adult,
J = juvenile.
Timing: timing was reported to be a crucial aspect of rooting response.
Age dependent: rooting was noted to decrease rapidly with age.

As noted in a recent study with lilac, the etiolation and banding techniques can serve in part to extend the period during which the propagator may obtain a useful rooting response. Indeed, some of the results in the present study suggest that the greatest benefit of the treatments is realized when the rooting of untreated controls is depressed (i.e. in an "off-season" for rooting).

One of the most exciting discoveries in the course of this research was that flexible separable hook and loop fasteners strips substitute nicely for the traditional band of black electrical tape. Futhermore, the application of rooting promoting substance to the stem using flexible separable hook and loop fasteners produced some striking responses, stem swelling and wounding among them. Although stem wounding is established as a treatment beneficial to the rooting of cuttings, the wounding in these experiments which resulted from the force of the Velcro hooks did not result in any noteworthy increases in rooting. The value of using root promoting substances with Velcro was not evident either, except in the trial with Corylus americana 'Rush'. However, the fact that these particular attributes of Velcro banding did not promote better rooting does not necessarily preclude their importance in the use of flexible separable hook and loop fasteners for banding.

Hare, (1976 supra) was successful with a hormone application procedure similar to the one developed here. He girdled shoots of Pinus elliottii var. elliottii and Platanus occidentalis, applied an aqueous slurry of rooting powder with a camel's hair brush, and covered the treated area with saran film and Al foil for 2 months or 4 weeks respectively. These treatments produced swelling in the treated area and occasionally induced the formation of root primordia. Rooting percentages in both species were increased dramatically by the treatments.

The timing of the banding application may be crucial to the response one can anticipate from banding. The two 'failures' among the experiments done here, Experiments 1b and 1c, may relate to the timing and method of banding used. In waiting for a sufficient number of the pine shoots to elongate enough for banding, changes in the anatomy or physiology of the stem resulting from exposure to the light may have occurred, increasing the developmental variability between shoots and reducing the efficacy of the banding treatment which followed. On the other hand, the poor response of these species to the banding treatments alone might reflect the species specificity for etiolation and banding which was to evident in Experiments 2 and 4. Pines may possess an absolute requirement for etiolation, similar to that observed in trials with Castanea mollissima and Betula papyrifera.

There are two ways in which the problem of timing might be circumvented. One would involve the use of etiolation to prevent the exposure to light of the stem area which is to be banded. In combination with banding this treatment would yield a zone of stem which had completed its growth without once being exposed to light. The other dates from Gardner's first trial with banding. He banded by wrapping the stem immediately behind the growing shoot tip, instead of banding basally as was done here. The success of apical banding may rely on excluding light early in the ontogeny of the stem, before changes induced by light have taken place. A serious drawback of apical banding is the risk of damaging the delicate apex and the difficulty in handling the shoot tip at this diminutive stage. In these respects etiolation is a more manageable option than apical banding.

The scheduling of etiolation and banding developed in this research supports that advocated by researchers at the East Malling Research Station: etiolation is applied at bud break for a period of about 2 weeks, until shoots are long enough for the application of bands, which are then left in place for up to 4 weeks. It is our opinion that etiolation should always be considered as an adjunct to banding when the propagation program for an untested species of cultivar is being developed, to determine of both treatments are necessary for optimal success in cutting propagation.

Several aspects of the data accumulated in this research are worth commenting on. One is that the cutting mortality observed in Experiment 1c was atypical; in most of the trials completed, the death of cuttings was of no consequence.

In contrast to the results of studies done at the East Malling Research Station (Howard, (1961 supra)), root number did not, in general, vary with the treatment received. Significant variations in root number may be particular to the rooting response of M.9 apple shoot cuttings to etiolation and banding. The range in the number of roots per rooted cutting in these experiments was often too large for the detection of any significant differences.

Finally, the choice of materials in Experiments 2 and 4 was fortuitous in that a comparison may be made of the response to etiolation and banding of juvenile and adult shoots of the same species. Specifically 1-yr. old shoots of Acer griseum rooted up to 34%, while the response of much older stock failed to exceed 5%. Young shoots of Quercus robur also rooted better than those from a mature hedge, reaching 70% and 36% respectively. One would hope that the success of the etiolation and banding treatments is not limited to juvenile materials. The responses observed in trials with older specimens of Taxus, Carpinus, and Corylus are reassuring. More comparisons between materials of differing ages are needed. Patterns of treatment responses exhibited striking similarities between young and old specimens of *Carpinus betulus* and *Acer griseum:* the former species responded primarily to banding, the latter required both pretreatments.

What is claimed is:

1. A method of prepairing a cutting propagule which comprises:
    (a) banding a parent plant in an area of succulent growth, which after severing will be the base of the cutting propagule, with a strip of opaque, flexible separable hook and loop fastener so that light is excluded and so that a portion of the hooks and loops of the fastener are in intimate contact with said banded area, wounding the area, for a time sufficient so that a reaction to light exclusion is evident in the banded area and the ability of the cutting propagule to root is enhanced by the action of the loops and the hooks against the area of succulent growth;
    (b) severing plant material comprising the banded area from the parent plant near the banded area to provide the cutting propagule.

2. The method as in claim 1 wherein the hooks and loops of the fastener are precoated with a composition comprising a plant root growth stimulating compound.

3. The method as in claim 2 where the composition comprises a dry powder.

4. The method as in claim 2 where the compound is selected from the group consisting of indole butyric acid, naphthalene acetic acid, indole acetic acid and 2,4-dioxane.

5. A method of preparing a cutting propagule which comprises:
    (a) etiolating at least the portion of the parent plant which is to be banded, to provide plant material in a chlorotic, succulent condition;
    (b) banding the etiolated plant material in an area of said chlorotic, succulent condition, which after severing will be the base of the cutting propagule, with a strip of opague, flexible separable hook and loop fastener so that a portion of the hooks and loops of the fastener are in intimate contact with said banded area, wounding the area, for a time sufficient to allow the unbanded etiolated areas to green and enhance the ability of the cutting propagule to root;
    (c) severing plant material comprising the banded area from the parent plant near the banded area to provide the cutting propagule.

6. The method as in claim 5 wherein the hooks and loops of the fastener are precoated with a composition comprising a plant root growth stimulating compound.

7. The method as in claim 6 where the composition comprises a dry powder.

8. The method as in claim 6 where the compound is selected from the group consisting of indole butyric acid, naphthalene acetic acid, indole acetic acid and 2,4-dioxane.

9. An opaque, flexible separable hook and loop fastener wherein the hooks and loops of the fastener are precoated with a composition comprising a plant root growth stimulating compound, said fastener being adapted to wrap around a section of a plant stem, so that light is excluded from that stem section and so that at least portion of the coated hooks and loops are in intimate contact with said stem section, wounding the stem section, to thereby enhance rooting action in said stem section.

10. The fastener as in claim 9 where the composition comprises a dry powder.

11. The fastener as in claim 9 where the compound is selected from the group consisting of indole butyric acid, napthalene acetic acid, indole acetic acid and 2,4-dioxane.

12. The fastener as in claim 9 where the compound is indole butyric acid.

* * * * *